United States Patent
Wallach et al.

(10) Patent No.: US 8,156,307 B2
(45) Date of Patent: Apr. 10, 2012

(54) MULTI-PROCESSOR SYSTEM HAVING AT LEAST ONE PROCESSOR THAT COMPRISES A DYNAMICALLY RECONFIGURABLE INSTRUCTION SET

(75) Inventors: Steven J. Wallach, Dallas, TX (US); Tony Brewer, Plano, TX (US)

(73) Assignee: Convey Computer, Richardson, TX (US)

( * ) Notice: Subject to any disclaimer, the term of this patent is extended or adjusted under 35 U.S.C. 154(b) by 729 days.

(21) Appl. No.: 11/841,406

(22) Filed: Aug. 20, 2007

(65) Prior Publication Data

US 2009/0055596 A1  Feb. 26, 2009

(51) Int. Cl.
G06F 12/00 (2006.01)
G06F 15/76 (2006.01)

(52) U.S. Cl. ......................................... 711/203
(58) Field of Classification Search .................. None
See application file for complete search history.

(56) References Cited

U.S. PATENT DOCUMENTS

| | | |
|---|---|---|
| 4,128,880 A | 12/1978 | Cray, Jr. |
| 4,386,399 A | 5/1983 | Rasala et al. |
| 4,685,076 A | 8/1987 | Yoshida |
| 4,817,140 A * | 3/1989 | Chandra et al. ............... 705/55 |
| 4,897,783 A | 1/1990 | Nay |
| 5,027,272 A | 6/1991 | Samuels et al. |
| 5,109,499 A | 4/1992 | Inagami et al. |
| 5,202,969 A | 4/1993 | Sato et al. |
| 5,222,224 A | 6/1993 | Flynn et al. |
| 5,283,886 A | 2/1994 | Nishii et al. |
| 5,513,366 A | 4/1996 | Agarwal et al. |
| 5,598,546 A | 1/1997 | Blomgren |
| 5,752,035 A * | 5/1998 | Trimberger .................. 717/153 |
| 5,838,984 A | 11/1998 | Nguyen et al. |
| 5,887,182 A | 3/1999 | Kinoshita |
| 5,887,183 A | 3/1999 | Agarwal et al. |
| 5,920,721 A | 7/1999 | Hunter et al. |
| 5,935,204 A | 8/1999 | Shimizu et al. |
| 5,937,192 A | 8/1999 | Martin |
| 5,999,734 A | 12/1999 | Willis et al. |
| 6,006,319 A * | 12/1999 | Takahashi et al. .............. 712/34 |

(Continued)

FOREIGN PATENT DOCUMENTS

EP  0 945 788  9/1999

(Continued)

OTHER PUBLICATIONS

The PC Guide, "The PC's x86 Instruction Set", 2004, www.pcguide.com/ref/cpu/arch/int/instX86-c.html.*

(Continued)

Primary Examiner — Edward Dudek, Jr.
Assistant Examiner — Ralph A Verderamo, III
(74) Attorney, Agent, or Firm — Fulbright & Jaworski L.L.P.

(57) ABSTRACT

A multi-processor system comprises at least one host processor, which may comprise a fixed instruction set, such as the well-known x86 instruction set. The system further comprises at least one co-processor, which comprises dynamically reconfigurable logic that enables the co-processor's instruction set to be dynamically reconfigured. In this manner, the at least one host processor and the at least one dynamically reconfigurable co-processor are heterogeneous processors having different instruction sets. Further, cache coherency is maintained between the heterogeneous host and co-processors. And, a single executable file may contain instructions that are processed by the multi-processor system, wherein a portion of the instructions are processed by the host processor and a portion of the instructions are processed by the co-processor.

26 Claims, 10 Drawing Sheets

U.S. PATENT DOCUMENTS

| | | | |
|---|---|---|---|
| 6,023,755 A * | 2/2000 | Casselman | 712/37 |
| 6,075,546 A | 6/2000 | Hussain et al. | |
| 6,076,139 A | 6/2000 | Welker et al. | |
| 6,076,152 A | 6/2000 | Huppenthal et al. | |
| 6,097,402 A | 8/2000 | Case et al. | |
| 6,125,421 A | 9/2000 | Roy | |
| 6,154,419 A | 11/2000 | Shakkarwar | |
| 6,170,001 B1 | 1/2001 | Hinds et al. | |
| 6,175,915 B1 | 1/2001 | Cashman et al. | |
| 6,195,676 B1 | 2/2001 | Spix et al. | |
| 6,202,133 B1 | 3/2001 | Jeddeloh | |
| 6,209,067 B1 | 3/2001 | Collins et al. | |
| 6,240,508 B1 | 5/2001 | Brown, III et al. | |
| 6,342,892 B1 | 1/2002 | Hook et al. | |
| 6,434,687 B1 | 8/2002 | Huppenthal | |
| 6,473,831 B1 | 10/2002 | Schade | |
| 6,480,952 B2 * | 11/2002 | Gorishek et al. | 712/227 |
| 6,611,908 B2 | 8/2003 | Lentz et al. | |
| 6,665,790 B1 | 12/2003 | Glossner, III et al. | |
| 6,684,305 B1 | 1/2004 | Deneau | |
| 6,738,967 B1 | 5/2004 | Radigan | |
| 6,789,167 B2 | 9/2004 | Naffziger | |
| 6,831,979 B2 | 12/2004 | Callum | |
| 6,868,472 B1 | 3/2005 | Miyake et al. | |
| 6,891,543 B2 | 5/2005 | Wyatt | |
| 6,983,456 B2 | 1/2006 | Poznanovic et al. | |
| 7,000,211 B2 | 2/2006 | Arnold | |
| 7,120,755 B2 | 10/2006 | Jamil et al. | |
| 7,149,867 B2 | 12/2006 | Poznanovic et al. | |
| 7,167,971 B2 | 1/2007 | Asaad et al. | |
| 7,225,324 B2 | 5/2007 | Huppenthal et al. | |
| 7,257,757 B2 | 8/2007 | Chun et al. | |
| 7,278,122 B2 | 10/2007 | Willis | |
| 7,328,195 B2 | 2/2008 | Willis | |
| 7,367,021 B2 | 4/2008 | Ansari et al. | |
| 7,376,812 B1 | 5/2008 | Sanghavi et al. | |
| 7,421,565 B1 | 9/2008 | Kohn | |
| 7,546,441 B1 | 6/2009 | Ansari et al. | |
| 7,577,822 B2 * | 8/2009 | Vorbach | 712/34 |
| 2001/0049816 A1 | 12/2001 | Rupp | |
| 2002/0046324 A1 | 4/2002 | Barroso et al. | |
| 2003/0005424 A1 | 1/2003 | Ansari et al. | |
| 2003/0140222 A1 * | 7/2003 | Ohmi et al. | 713/1 |
| 2003/0226018 A1 * | 12/2003 | Tardo et al. | 713/168 |
| 2004/0107331 A1 * | 6/2004 | Baxter | 712/15 |
| 2004/0117599 A1 | 6/2004 | Mittal et al. | |
| 2004/0193837 A1 | 9/2004 | Devaney et al. | |
| 2004/0193852 A1 | 9/2004 | Johnson | |
| 2004/0194048 A1 | 9/2004 | Arnold | |
| 2004/0215898 A1 * | 10/2004 | Arimilli et al. | 711/144 |
| 2004/0221127 A1 * | 11/2004 | Ang | 711/203 |
| 2004/0236920 A1 | 11/2004 | Sheaffer | |
| 2004/0243984 A1 * | 12/2004 | Vorbach et al. | 717/136 |
| 2004/0250046 A1 * | 12/2004 | Gonzalez et al. | 712/11 |
| 2005/0027970 A1 * | 2/2005 | Arnold et al. | 712/226 |
| 2005/0108503 A1 | 5/2005 | Sandon et al. | |
| 2005/0172099 A1 * | 8/2005 | Lowe | 711/207 |
| 2005/0188368 A1 | 8/2005 | Kinney | |
| 2005/0223369 A1 | 10/2005 | Chun et al. | |
| 2005/0262278 A1 | 11/2005 | Schmidt | |
| 2006/0075060 A1 | 4/2006 | Clark | |
| 2006/0259737 A1 | 11/2006 | Sachs et al. | |
| 2006/0288191 A1 | 12/2006 | Asaad et al. | |
| 2007/0005881 A1 | 1/2007 | Garney | |
| 2007/0005932 A1 | 1/2007 | Covelli et al. | |
| 2007/0038843 A1 | 2/2007 | Trivedi et al. | |
| 2007/0106833 A1 | 5/2007 | Rankin et al. | |
| 2007/0130445 A1 | 6/2007 | Lau et al. | |
| 2007/0153907 A1 | 7/2007 | Mehta et al. | |
| 2007/0157166 A1 | 7/2007 | Stevens | |
| 2007/0186210 A1 | 8/2007 | Hussain et al. | |
| 2007/0226424 A1 * | 9/2007 | Clark et al. | 711/141 |
| 2007/0245097 A1 | 10/2007 | Gschwind et al. | |
| 2007/0283336 A1 | 12/2007 | Gschwind et al. | |
| 2007/0288701 A1 | 12/2007 | Hofstee et al. | |
| 2007/0294666 A1 | 12/2007 | Papakipos et al. | |
| 2008/0059758 A1 | 3/2008 | Sachs | |
| 2008/0059759 A1 | 3/2008 | Sachs | |
| 2008/0059760 A1 | 3/2008 | Sachs | |
| 2008/0209127 A1 | 8/2008 | Brokenshire et al. | |
| 2008/0215854 A1 * | 9/2008 | Asaad et al. | 712/214 |

FOREIGN PATENT DOCUMENTS

| | | |
|---|---|---|
| EP | 1 306 751 | 5/2003 |
| WO | WO-2008/014494 | 1/2008 |

OTHER PUBLICATIONS

Andreas Koch and Ulrich Golze, "A Universal Co-processor for Workstations", 1994, Abingdon EE&CS Books, pp. 8 and 9.*

Hauck, S, "The roles of FPGAs in reprogrammable systems", Proceedings of the IEEE, 615-638, Apr. 1998.*

Hartenstein, R., Keevallik, A., Shirazi, N., Luk, W. and Cheung, P., "Run-time management of dynamically reconfigurable designs", Field-Programmable Logic and Applications from FPGAs to Computing Paradigm, 1998.*

Page, I., "Reconfigurable processor architectures", Microprocessors and Microsystems, vol. 20, Issue 3, May 1996, pp. 185-196.*

Callahan, T.J., Hauser, J.R., Wawrzynek, J., "The GARP Architecture and C Compiler", Computer, vol. 33, No. 4, pp. 62-69, Apr. 2000.*

U.S. Appl. No. 11/841,406, Wallach et al.

U.S. Appl. No. 11/847,169, Wallach et al.

International Search Report and Written Opinion issued for PCT/US08/74566 dated Nov. 14, 2008, 9 pgs.

XESS Corporation, "XSA Board V1.1, V1.2 User Manual", (Release Date: Jun. 23, 2005).

XESS, "XSA-50 Spartan-2 Prototyping Board with 2.5V, 50,000-gate FPGA" (copyright 1998-2008).

International Search Report and Written Opinion issued for PCT/US08/75828 dated Nov. 18, 2008, 12 pgs.

International Search Report and Written Opinion issued for PCT/US09/60811, dated Dec. 1, 2009, 7 pgs.

International Search Report and Written Opinion issued for PCT/US09/60820, dated Dec. 9, 2009, 8 pgs.

International Search Report and Written Opinion issued for PCT/US08/87233, dated Feb. 5, 2009, 11 pgs.

L.N. Bhuyan, "Lecture 15: Symmetric Multiprocessor: Cache Protocols", Feb. 28, 2001, 16 pgs.

Levine et al., "Efficient Application Representation for HASTE: Hybrid Architectures with a Single, Transformable Executable", 2003, 10 pgs.

International Search Report and Written Opinion issued for PCT/US08/73423 dated Nov. 12, 2008, 12 pgs.

Siewiorek, Daniel P.; Bell, Gordon C.; Newell, Allen; "Computer Structures: Principles and Examples" McGraw-Hill, 1982, p. 334, Figure 1(a).

Cray XD1™ FPGA Development, Release 1.2; S-6400-12, issued Apr. 18, 2005. Available at www.eng.uah.edu/~jacksoa/CrayXD1FPGADevelopment.pdf.

Callahan, Timothy J.; Hauser, John R.; Wawrzynek, John; "The Garp Architecture and C Compiler", IEEE Computer, vol. 33, No. 4, pp. 62-69, Apr. 2000.

Poster entitled GigaScale Mixed-Signal System Verification, FTL Systems, Inc. presented at the DARPA/MTO Team/NeoCAD2003 Fall Review, Sep. 15-17, 2003, Monterey, CA, a public unclassified meeting.

Poster entitled StarStream™ GigaScale Mixed-Signal System Verification, FTL Systems, Inc. presented at the DARPA/MTO Team/NeoCAD Program Review, Feb. 23, 2004, Scottsdale, AZ, Monterey, CA, a public unclassified meeting.

StarStream Design Summary; FTL Systems, Inc., available at Design Automation Conference (DAC), Jun. 2005, Anaheim, CA.

Gokhale, Maya; "Heterogeneous Processing", Los Alamos Computer Science Institute LACSI 2006, Oct. 17-19, 2006, Santa Fe, NM. Available at www.cct.Isu.edu/~estrabd/LACSI2006/workshops/workshop5/gokhale_mccormick.pdf.

The Extended European Search Report issued for EP 08827665.4, dated Nov. 5, 2010, 6 pages.

Vassiliadis et al., "The ARISE Reconfigurable Instruction Set Extension Framework", Jul. 16, 2007.

Gerald Estrin, "Organization of Computer Systems—The Fixed Plus Variable Structure Computer", 1960.

Arnold, Jeffrey M., et al. "The Splash 2 Processor and Applications", 1993 IEEE, pp. 482-485.

Gokhale, Maya, et al. "Reconfigurable Computing", Accelerating Computation with Field-Programmable Gate Arrays, © Springer, pp. 4-6 and 60-64, 2005.

Belgard, Rich, "Reconfigurable Illogic", Microprocessor, The Insiders Guide to Microprocessor Hardware, May 10, 2004, 4 pgs.

Trednnick, Nick et al., "Microprocessor Sunset", Microprocessor, The Insiders Guide to Microprocessor Hardware, May 3, 2004, 4 pgs.

\* cited by examiner

MULTI-PROCESSOR SYSTEM HAVING AT LEAST ONE PROCESSOR THAT COMPRISES A DYNAMICALLY RECONFIGURABLE INSTRUCTION SET

TECHNICAL FIELD

The following description relates generally to multi-processor systems, and more particularly to a multi-processor system that comprises at least one processor having a dynamically reconfigurable instruction set.

BACKGROUND OF THE INVENTION

The popularity of computing systems continues to grow and the demand for improved processing architectures thus likewise continues to grow. Ever-increasing desires for improved computing performance/efficiency has led to various improved processor architectures. For example, multi-core processors are becoming more prevalent in the computing industry and are being used in various computing devices, such as servers, personal computers (PCs), laptop computers, personal digital assistants (PDAs), wireless telephones, and so on.

In the past, processors such as CPUs (central processing units) featured a single execution unit to process instructions of a program. More recently, computer systems are being developed with multiple processors in an attempt to improve the computing performance of the system. In some instances, multiple independent processors may be implemented in a system. In other instances, a multi-core architecture may be employed, in which multiple processor cores are amassed on a single integrated silicon die. Each of the multiple processors (e.g., processor cores) can simultaneously execute program instructions. This parallel operation of the multiple processors can improve performance of a variety of applications.

A multi-core CPU combines two or more independent cores into a single package comprised of a single piece silicon integrated circuit (IC), called a die. In some instances, a multi-core CPU may comprise two or more dies packaged together. A dual-core device contains two independent microprocessors and a quad-core device contains four microprocessors. Cores in a multi-core device may share a single coherent cache at the highest on-device cache level (e.g., L2 for the Intel® Core 2) or may have separate caches (e.g. current AMD® dual-core processors). The processors also share the same interconnect to the rest of the system. Each "core" may independently implement optimizations such as superscalar execution, pipelining, and multithreading. A system with N cores is typically most effective when it is presented with N or more threads concurrently.

One processor architecture that has been developed utilizes multiple processors (e.g., multiple cores), which are homogeneous in that they are all implemented with the same fixed instruction sets. Further, the homogeneous processors may employ a cache memory coherency protocol, as discussed further below.

In general, an instruction set refers to a list of all instructions, and all their variations, that a processor can execute, Such instructions may include, as examples, arithmetic instructions, such as ADD and SUBTRACT; logic instructions, such as AND, OR, and NOT; data instructions, such as MOVE, INPUT, OUTPUT, LOAD, and STORE; and control flow instructions, such as GOTO, if X then GOTO, CALL, and RETURN. Examples of well-known instruction sets include x86 (also known as IA-32), x86-64 (also known as AMD64 and Intel® 64), VAX (Digital Equipment Corporation), IA-64 (Itanium), and PA-RISC (HP Precision Architecture).

Generally, the instruction set architecture is distinguished from the microarchitecture, which is the set of processor design techniques used to implement the instruction set. Computers with different microarchitectures can share a common instruction set. For example, the Intel® Pentium and the AMD® Athlon implement nearly identical versions of the x86 instruction set, but have radically different internal microarchitecture designs. In all these cases the instruction set (e.g., x86) is fixed by the manufacturer and directly implemented, in a semiconductor technology, by the microarchitecture. Consequently, the instruction set is fixed for the lifetime of this implementation.

Memory coherency is an issue that affects the design of computer systems in which two or more processors share a common area of memory. In general, processors often perform work by reading data from persistant storage into memory, performing some operation on that data, and then storing the result back to persistant storage. In a uniprocessor system, there is only one processor doing all the work, and therefore only one processor that can read or write the data values. Moreover a simple uniprocessor can only perform one operation at a time, and thus when a value in storage is changed, all subsequent read operations will see the updated value. However, in multiprocessor systems (e.g., multi-core architectures) there are two or more processors working at the same time, and so the possibility that the processors will all attempt to process the same value at the same time arises. Provided none of the processors updates the value, then they can share it indefinitely; but as soon as one updates the value, the others will be working on an out-of-date copy of the data. Accordingly, in such multiprocessor systems a scheme is generally required to notify all processors of changes to shared values, and such a scheme that is employed is commonly referred to as a "cache coherence protocol." Various well-known protocols have been developed for maintaining cache coherency in multiprocessor systems, such as the MESI protocol, MSI protocol, MOSI protocol, and the MOESI protocol, are examples. Accordingly, such cache coherency generally refers to the integrity of data stored in local caches of the multiple processors.

FIG. 1 shows an exemplary prior art system 10 in which multiple homogeneous processors (or cores) are implemented System 10 includes a first microprocessor 11 and a second microprocessor 12 with an interconnecting bus 13 between them. In this example, microprocessors 11 and 12 are homogeneous in that they are each implemented to have the same, fixed instruction set, such as x86. A main memory 11-1 is connected to microprocessor 11, and a main memory 12-1 is connected to microprocessor 12. Main memories 11-1 and 12-1 are in the same physical address space so that microprocessors 11 and 12 can each reference either of the two main memories, 11-1 or 32-1A cache coherence protocol is implemented across the busses in order to allow the microprocessors to get the latest value of the memory wherever it currently exists.

As an example, a global physical memory address format 14 is implemented, which has a value that includes a node number 14-1 and an offset 14-2. In this example, all elements labeled 11, including microprocessor 11, main memory 11-1, cache 11-2, and Translation Look-aside Buffer (TLB) 11-3, make up a first node 101, while all elements labeled 12, including microprocessor 12, main memory 12-1, cache 12-2, and TLB 12-3, make up a second node 102. In the global physical memory address format 14, node number 14-1 indicates which node the actual physical memory resides on, and the offset 14-2 is the offset into the actual physical memory on that node.

In many architectures, virtual addresses are utilized. In general, a virtual address is an address identifying a virtual (non-physical) entity. As is well-known in the art, virtual addresses may be utilized for accessing memory. Virtual memory is a mechanism that permits data that is located on a persistent storage medium (e.g., disk) to be referenced as if the data was located in physical memory. Translation tables, maintained by the operating system, are used to determine the location of the reference data (e.g., disk or main memory). Program instructions being executed by a processor may refer to a virtual memory address, which is translated into a physical address. To minimize the performance penalty of address translation, most modern CPUs include an on-chip Memory Management Unit (MMU), and maintain a table of recently used virtual-to-physical translations, called a Translation Look-aside Buffer (TLB). Addresses with entries in the TLB require no additional memory references (and therefore time) to translate. However, the TLB can only maintain a fixed number of mappings between virtual and physical addresses; when the needed translation is not resident in the TLB, action will have to be taken to load it in.

As an example, suppose a program's instruction stream that is being executed by a processor, say processor 11 of FIG. 1, desires to load data from an address "Foo" into a first general-purpose register, GPR1. Such instruction may appear similar to "LD <Foo>, GRP1". Foo, in this example, is a virtual address that the processor translates to a physical address, such as address "123456". Thus, the actual physical address, which may be formatted according to the global physical memory address format 14, is placed on bus 11-4 for accessing main memory 11-1, for example. Cache coherency is maintained in that if processor 12 is also executing instructions that are attempting to access "Foo" (the physical address 123456) at the same time that processor 11 is accessing it, then the cache coherency scheme resolves this to allow the microprocessors to get the latest value of Foo.

As shown in the example of FIG. 1, a cache is contained within each of the individual microprocessors, shown as cache 11-2 within microprocessor 11 and cache 12-2 within microprocessor 12. Each microprocessor first attempts to access data out of its respective cache and when it references data that is not in its cache, it looks at main memory 11-1 and 12-1 using the global physical memory address format 14. From the node number 14-1, the microprocessor decides if the physical address or physical memory is associated wit the memory of that node or if it must traverse to a remote node in order to access the remote node's memory. For example, when microprocessor 11 attempts to access data, it first attempts to access the data in its cache 11-2. If the data is not in cache 11-2, then microprocessor 11 evaluates node number 14-1 of the global physical memory address format of such data. If node number 14-1 identifies node 101 (or main memory 11-1 of node 101), then microprocessor 11 determines that the data is contained in main memory 11-1, and if node number 14-1 identifies node 102 (or main memory 12-1 of node 102), then microprocessor 11 determines that the data is contained in main memory 12-1. The data may be read from the main memory of the identified node, and may be stored to microprocessor 11's cache 11-2 for ready subsequent accesses.

Also shown in FIG. 1 is that each microprocessor includes a TLB, such as TLB 11-3 of microprocessor 11 and TLB 12-3 of microprocessor 12. As mentioned above, and as is well-known in the art, the role of the TLB is to translate from a virtual address (e.g., "Foo" in the above example) to the physical address. Thus, TLBs 11-3 and 12-3 are responsible for performing virtual-to-physical address translation. Accordingly, when microprocessor 11 issues a load request, it presents the virtual address to TLB 11-3. TLB 11-3 looks up the virtual address in its table, and if found, then TLB 11-3 outputs a physical address that is used to actually access cache 11-2 or main memory 11-1. If the virtual address does not exist in TLB 11-3, then microprocessor 11 walks a series of tables that are located in main memory 11-1 to find a TLB entry to be placed in TLB 11-3 to complete the reference and all future references for that virtual address.

Thus, in this exemplar architecture, multiple homogeneous processors (e.g., processors 11 and 12) that each have common, fixed instruction sets may be implemented with a cache coherency protocol. Such a multi-processor system that has multiple homogeneous processors provides many benefits. One significant benefit of this type of multi-processor system is that a compiler can generate one executable file (e.g., a single "a.out" executable, which is well known in the art as the UNIX definition of an executable image), which may have its instructions processed by the multiple homogeneous processors. This is important for programmer productivity. Another benefit of this exemplary multi-processor system is its elimination of the need of a programmer to manage the location of data. Without a cache coherency mechanism, the programmer must explicitly manage and move data for use by an executable, which lowers programmer productivity and lowers application performance. However, because the processors are homogeneous, they each have the same processing capabilities, and thus one processor is not better suited for performing certain types of operations more efficiently than the other.

In some architectures, special-purpose processors that are often referred to as "accelerators" are implemented to perform certain types of operations. For example, a processor executing a program may offload certain types of operations to an accelerator that is configured to perform those types of operations efficiently. Such hardware acceleration employs hardware to perform some function faster than is possible in software running on the normal (general-purpose) CPU. Hardware accelerators are generally designed for computationally intensive software code. Depending upon granularity, hardware acceleration can vary from a small functional unit to a large functional block like motion estimation in MPEG2. Examples of such hardware acceleration include blitting acceleration functionality in graphics processing units (GPUs) and instructions for complex operations in CPUs. Such accelerator processors generally have a fixed instruction set that differs from the instruction set of the general-purpose processor, and the accelerator processor's local memory 16-2 does not maintain cache coherency with the general-purpose processor.

A graphics processing unit (GPU) is a well-known example of an accelerator. A GPU is a dedicated graphics rendering device commonly implemented for a personal computer, workstation, or game console. Modern GPUs are very efficient at manipulating and displaying computer graphics, and their highly parallel structure makes them more effective than typical CPUs for a range of complex algorithms. A GPU implements a number of graphics primitive operations in a way that makes running them much faster than drawing directly to the screen with the host CPU. The most common operations for early two-dimensional (2D) computer graphics include the BitBLT operation (combines several bitmap patterns using a RasterOp), usually in special hardware called a "blitter", and operations for drawing rectangles, triangles, circles, and arcs. Modern GPUs also have support for three-dimensional (3D) computer graphics, and typically include digital video-related functions.

FIG. 2 shows an exemplary prior art system architecture in which accelerator hardware 16, such as GPU 16-1 is implemented. The accelerator hardware 16 is capable of being called by host processors 11 and 12 via input/output (I/O) 15. Thus, for instance, graphics operations of a program being executed by host processors 11 and 12 may be passed to GPU 16-1 via I/O 15. While the homogeneous host processors 11 and 12 maintain cache coherency with each other, as discussed above with FIG. 1, they do not maintain cache coherency with accelerator hardware 16 (e.g., GPU 16-1). This means that CPU 16-1 reads and writes to its local memory are NOT part of the hardware-based cache coherency mechanism used by nodes 101 and 102. This also means that GPU 16-1 does not share the same physical or virtual address space of nodes 101 and 102.

Thus, in this exemplary architecture, heterogeneous processors that each have different, fixed instruction sets may be implemented. That is, general-purpose processor(s), such as processors 11 and 12, may be implemented having a first instruction set, and an accelerator processor, such as GPU 16-1, may be implemented having a different instruction set for performing certain types of operations efficiently. A cache coherency protocol is not used between the heterogeneous processors (e.g., between general-purpose processors 11, 12 and accelerator processor 16).

Accordingly, in some architectures a plurality of homogeneous processors are implemented that each have fixed, common instruction sets and which maintain cache coherency with each other. And, in some architectures a plurality of heterogeneous processors are implemented that have fixed, different instruction sets (e.g., in FIG. 2 host processors 11 and 12 each have a fixed first instruction set, such as x86, and accelerator 16 provides a heterogeneous processor with a different fixed instruction set), wherein cache coherency is not maintained across the heterogeneous processors.

Application-specific integrated circuits (ASICs) are known, which are commonly implemented as custom designs. An ASIC is an integrated circuit (IC) customized for a particular use, rather than intended for general-purpose use. For example, an ASIC may be implemented as a chip that is designed solely to run a cellular telephone. In contrast, the well-known 7400 series and 4000 series integrated circuits are logic building blocks that can be wired together for use in many different applications. As feature sizes have shrunk and design tools improved over the years, the maximum complexity (and hence functionality) possible in an ASIC has grown from 5,000 gates to over 100 million. Modern ASICs often include entire 32-bit processors, memory blocks including ROM, MM, EEPROM, Flash and other large building blocks. Designers of digital ASICs generally use a hardware description language (HDL), such as Verilog or VHDL, to describe the functionality of ASICs. Once a design is completed and a mask set produced for a target chip, an ASIC is created. The configuration is created once. If a new configuration is needed, an entirely new design is needed. Thus, ASICs are not field-programmable.

Additionally, various devices are known that are reconfigurable. Examples of such reconfigurable devices include field-programmable gate arrays (FPGAs). A field-programmable gate array (FPGA) is a well-known type of semiconductor device containing programmable logic components called "logic blocks", and programmable interconnects. Logic blocks can be programmed to perform the function of basic logic gates such as ND, and XOR, or more complex combinational functions such as decoders or simple mathematical functions. In most FPGAs, the logic blocks also include memory elements, which may be simple flip-flops or more complete blocks of memories. A hierarchy of programmable interconnects allows logic blocks to be interconnected as desired by a system designer. Logic blocks and interconnects can be programmed by the customer/designer, after the FPGA is manufactured, to implement any logical function, hence the name "field-programmable."

BRIEF SUMMARY OF THE INVENTION

The present invention is directed generally to multi-processor systems, and more particularly to a multi-processor system that comprises at least one processor having a dynamically reconfigurable instruction set. According to certain embodiments, at least one host processor is implemented in the system, which may comprise a fixed instruction set, such as the well-known x86 instruction set. Additionally, at least one co-processor is implemented, which comprises dynamically reconfigurable logic that enables the co-processor's instruction set to be dynamically reconfigured. In this manner, the at least one host processor and the at least one dynamically reconfigurable co-processor are heterogeneous processors because the dynamically reconfigurable co-processor may be configured to have a different instruction set than that of the at least one host processor. According to certain embodiments, the co-processor may be dynamically reconfigured with an instruction set for use in optimizing performance of a given executable. For instance, in certain embodiments, one of a plurality of predefined instruction set images may be loaded onto the co-processor for use by the co-processor in processing a portion of a given executable's instruction stream.

In certain embodiments, an executable (e.g., an a.out file or a.exe file, etc.) may include (e.g., in its header) an identification of an instruction set with which the co-processor is to be configured for use in processing a portion of the executable's instruction stream. Accordingly, when the executable is initiated, the system's operating system (OS) may determine whether the co-processor possesses the instruction set identified for the executable. If determined that the co-processor does not possess the identified instruction set, the OS causes the co-processor to be reconfigured to possess such identified instruction set. Then, a portion of the instructions of the executable may be off-loaded for processing by the co-processor according to its instruction set, while a portion of the executable's instructions may be processed by the at least one host processor. Accordingly, in certain embodiments, a single executable may have instructions that are processed by different, heterogeneous processors that possess different instruction sets. As described further herein, according to certain embodiments, the co-processor's instructions are decoded as if they were defined with the host processor's instruction set (e.g., x86's ISA). In essence, to a compiler, it appears that tile host processor's instruction set (e.g., the x86 ISA) has been extended.

As is well-known in the art, a compiler generally refers to a computer program (or set of programs) that translates a source file (e.g., text written in a computer language) into another computer language (the target language). The most common reason for wanting to translate source code is to create an executable program. Thus, a "compiler" primarily refers to programs that translate source code from a high-level programming language to a lower level language (e.g., assembly language or machine language). A compiler is likely to perform many or all of the following operations:

lexical analysis, preprocessing, parsing, semantic analysis, code generation, and code optimization.

Further, according to certain embodiments of the present invention, cache coherency is maintained between at least one host processor and at least one dynamically reconfigurable co-processor. That is, cache coherency is maintained between at least one host processor and a heterogeneous co-processor that is configured with a different instruction set than that of the host processor. In certain embodiments, the physical memory space and the virtual memory space are both shared by the heterogeneous processors.

Further, according to certain embodiments of the present invention, a plurality of instruction sets that the co-processor may be configured to possess are pre-defined. The plurality of instruction sets may be stored to persistent data storage (e.g., to disk) of the system, such that a given executable may identify any of the plurality of pre-defined instruction sets to be loaded onto the co-processor for use by the co-processor in processing a portion of the given executable's instruction stream.

According to certain embodiments of the present invention, a technique is employed to effectively trick the host processor's instruction set (e.g., the x86 instruction set) to support offloading to the co-processor an executable's instructions that may not be natively supported by the host processor's instruction set. According to certain embodiments, the instruction set of the host processor (e.g., x86) is fixed and is implemented by the hardware micro-architecture. The host instruction set cannot be modified once a design of the host processor's micro-architecture is completed and manufactured. According to one embodiment of the present invention, the host processor is effectively "tricked" by causing the host processor to store the executable's instructions that are to be off-loaded to the co-processor to a pre-designated portion of memory, which may be referred to herein as a user command block (UCB). The co-processor monitors the UCB to detect when instructions have been stored thereto, and upon detection of instructions in the UCB, the co-processor processes those instructions with the instruction set with which it has been configured. In this manner, when generating a given executable, a compiler can include in the executable instructions that may not be supported by the host processor's instruction set but which are instead intended for processing under a different instruction set (that the co-processor is to be configured to have). The compiler can also include in the executable's instruction stream an instruction to cause the host processor to load certain instructions of the executable (such as those instructions that are intended for processing by the co-processor's instruction set) to the UCB. Such a loading operation is supported by the host processor's native instruction set, although processing of those instructions that it loads to the UCB may not be supported by the host processor's native instruction set. The above-mentioned cache coherency between the host processor and the co-processor enables the host processor and co-processor to use the UCB in this manner.

According to one embodiment of the present invention, a system comprises at least two processor elements, where each of the processor elements are running a corresponding instruction set. As used herein, processors or "processor elements" of a multi-processor system may each comprise a separate processor or a separate core, as examples. A first instruction set is employed in a first of the processor elements (e.g., in a host processor) and a second instruction set is employed in a second one of the processor elements (e.g., in a co-processor), wherein the first and second instruction sets are different from each other. Thus, the first and second processor elements are "heterogeneous" in that they each possess different instruction sets. Further, the first and second processor elements each are communicatively coupled to a respective local cache memory, wherein cache coherency is hardware maintained between the first and second processor elements. Further, the first and second processor elements share the same virtual address space. Further still, the first and second processor elements share the same global physical address space.

According to one embodiment, the first instruction set is fixed within the first processing element, and the second instruction set is changeable within the second processor element from time-to-time. For example, a host processor may have a fixed instruction set of, say, x86, while a dynamically reconfigurable co-processor may be implemented with a set of instructions that can be dynamically reconfigured from time-to-time (e.g., as may be specified by an executable being processed at a given time by the processor elements).

According to one embodiment of the present invention, a multi-processor system is provided that comprises heterogeneous processors. At least one of the heterogeneous processors is capable of having its instruction set dynamically reconfigured. According to one embodiment, a plurality of instruction set configurations are predefined, and may be stored to persistent data storage of the system, such as to disk. Thus, the dynamically reconfigurable processor may be selectively reconfigured to possess any of the predefined instruction set configurations. Accordingly, in certain embodiments, a given executable may include an identification of one of the predefined instruction set configurations to be loaded onto the dynamically reconfigurable processor for use in processing instructions of the given executable. Then, a portion of the given executable's instruction stream may be processed by one of the processors in the multi-processor system, and another portion of the executable's instruction stream may be processed by a different, heterogeneous processor in the multi-processor system.

In certain embodiments, an executable includes information that identifies an instruction set configuration to be loaded onto the dynamically reconfigurable processor. When the executable is initiated for execution by a host processor, a determination is made (e.g., by the system's OS) whether the dynamically reconfigurable processor is configured with the instruction set configuration identified by the executable. If not, then the identified instruction set configuration is loaded onto the dynamically reconfigurable processor for use in processing a portion of the executable's instruction stream by such dynamically reconfigurable processor.

A portion of the instructions in the executable's instruction stream are passed for execution by the dynamically reconfigurable processor. Thus, according to certain embodiments of the present invention, a single executable (e.g., a single a.out or a.exe file) may possess instructions that are executed by heterogeneous processors. For example, a host processor may comprise a fixed instruction set, such as the well-known x86 instruction set, and a dynamically reconfigurable co-processor may be configured with a different instruction set; and, a portion of the executable's instruction stream may be processed by the host processor, while another portion of the executable's instruction stream is processed by the heterogeneous, dynamically reconfigurable co-processor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 2:
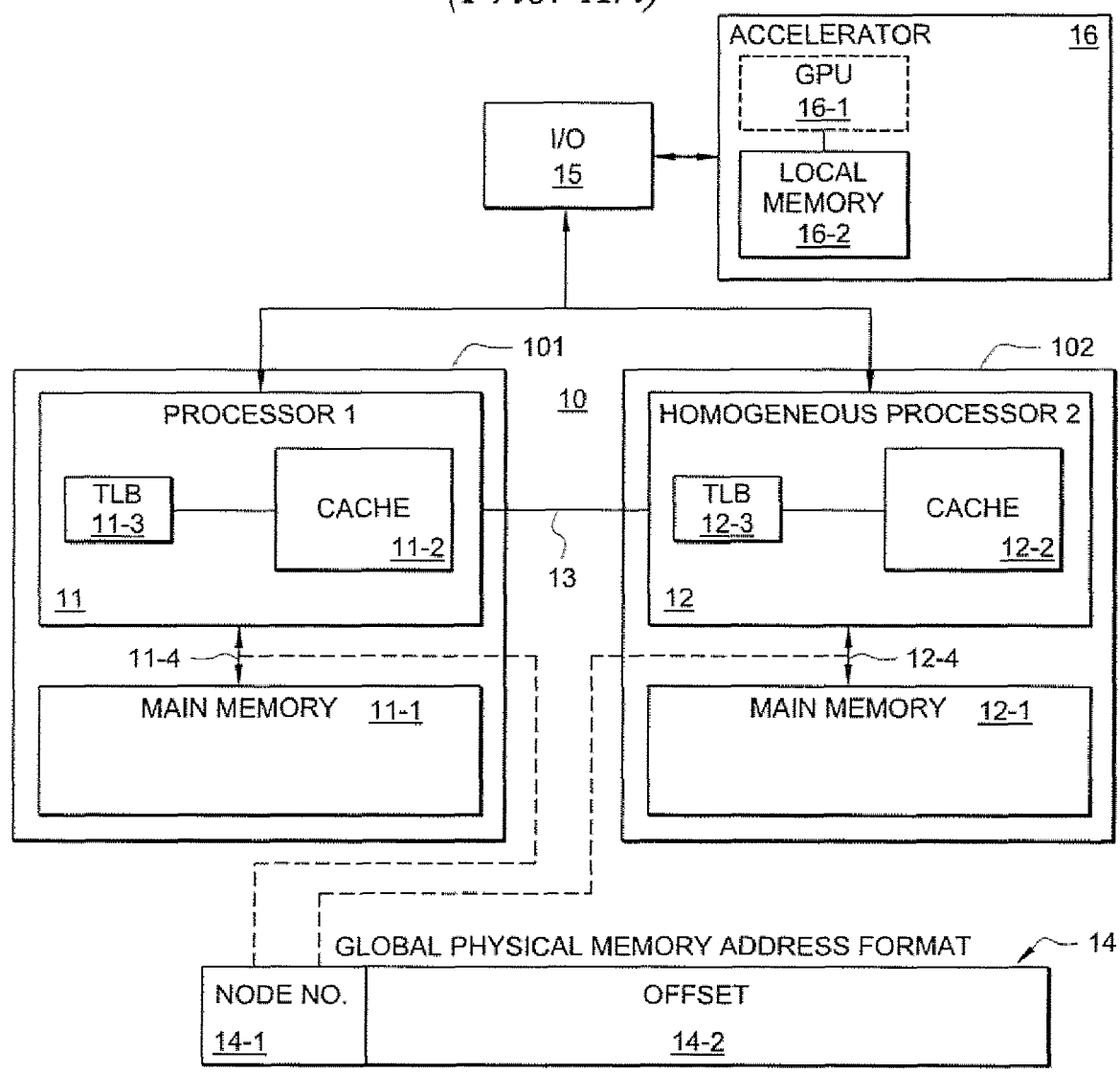
FIG. 2 shows an exemplary prior art multi-processor system employing a plurality of heterogeneous processors.
Figure 3:
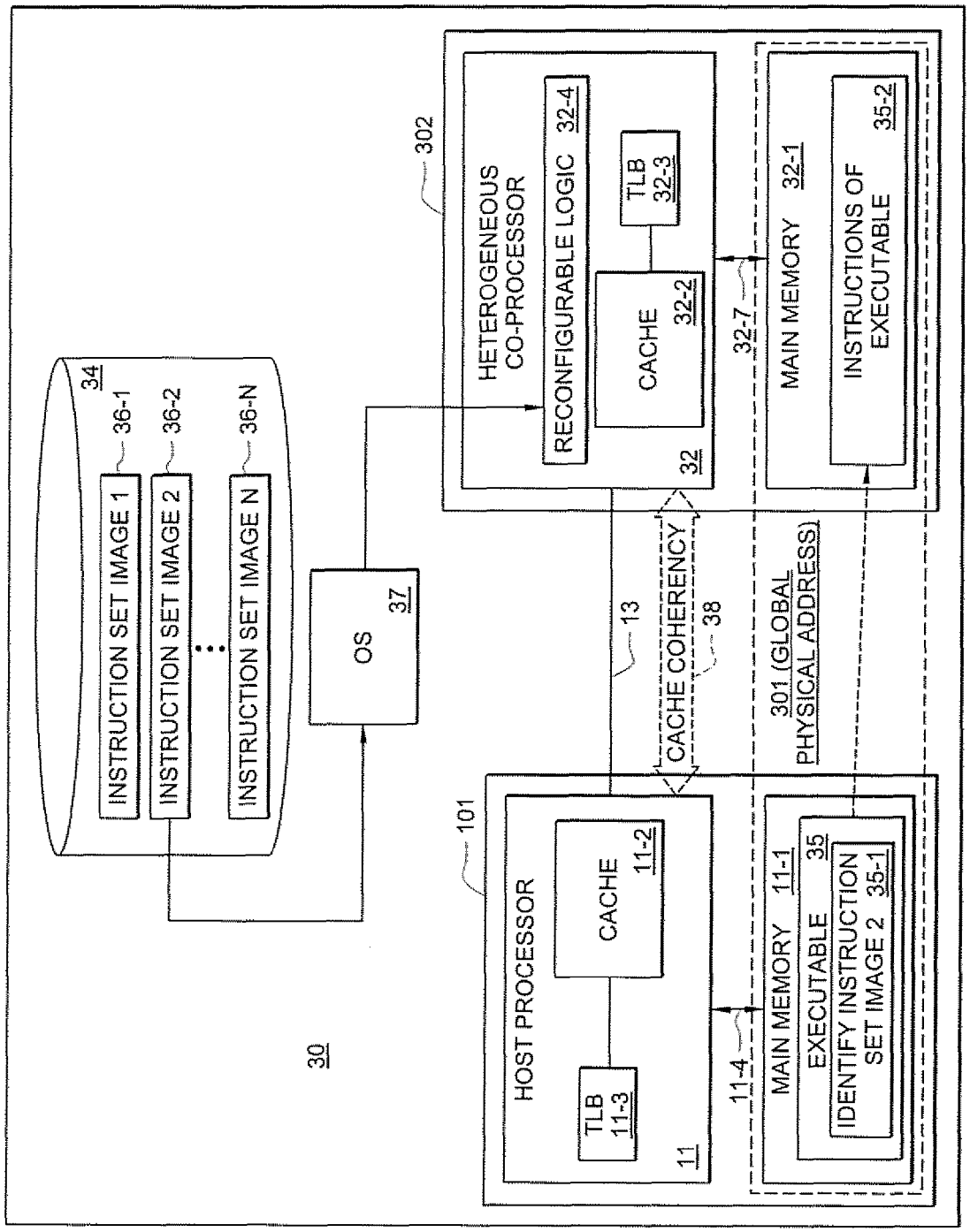
FIG. 3 shows an exemplary multi-processor system according to one embodiment of the present invention.

FIG. 3 shows an exemplary multi-processor system 30 according to one embodiment of the present invention. As shown, multi-processor system 30 comprises a first node 101 having processor 11, which may be referred to as a "host" processor in this example. In certain embodiments, host processor 11 may comprise a plurality of homogeneous processors (commonly referred to as a multi-core microprocessor), such as processors 11 and 12 described above with FIGS. 1 and 2. Multi-processor system 30 further comprises a second processor 32 (in a second node 302), which may be referred to as a dynamically reconfigurable co-processor in this example because, as discussed further below, such second processor 32 has a dynamically reconfigurable instruction set. Host processor 11 may comprise a fixed instruction set, such as the well-known x86 instruction set. Co-processor 32 comprises dynamically reconfigurable logic 32-4 (e.g., a FPGA) that enables the co-processor's instruction set to be dynamically reconfigured. In this manner, host processor 11 and dynamically reconfigurable co-processor 32 are heterogeneous processors because the dynamically reconfigurable co-processor 32 may be configured to have a different instruction set than that of host processor 11.

An interconnecting bus 13 communicatively interconnects node 101 and node 302 in this example. In this example, host processor 11 comprises TLB 11-3 and cache 11-2, and main memory 11-1 is connected to host processor 11. Thus, all elements labeled 11, including main memory 11-1, cache 11-2, and TLB 11-3 may be considered a first (or "host") processor node 101. Similarly, in this example, co-processor 32 comprises TLB 32-3 and cache 32-2, and main memory 32-1 is connected to co-processor 32. Additionally, as discussed further herein, co-processor 32 comprises dynamically reconfigurable logic 32-4. All elements labeled 32, including main memory 32-1, cache 32-2, TLB 32-3, and reconfigurable logic 32-4 may be considered a second (or "co-processor") node 302.

Multi-processor system 30 further comprises an operating system 37 that is executing on host processor 11, which may be any OS that is compatible with the given host processor 11, such as the well-known UNIX, MICROSOFT WINDOWS, MAC OS X, HP-UX, AIX, and SOLARIS operating systems, as examples. Multi-processor system 30 also comprises persistent data storage 34, such as disk, to which various data (e.g., software programs, etc.) may be stored in a manner as is well-known in the art. In the illustrated example, instruction set images 36-1, 36-2, . . . , 36-N are stored to persistent data storage 34, any of which may be selectively loaded onto reconfigurable logic 32-4 of co-processor 32, as discussed further below. Thus, a plurality of fixed, predefined instruction set images 36-1-36-N may be stored to data storage 34 of system 30, wherein any of such instruction set images may be used for configuring co-processor 32 for a given executable. Further, a plurality of different executables may utilize the same instruction set configuration for co-processor 32, rather than requiring co-processor 32 to have an application-specific configuration that is tailored specifically for each executable.

In this exemplary embodiment, main memories 11-1 and 32-1 are in the same global physical address space so that processors 11 and 32 can each reference either of the two memories, 11-1 or 32-1. That is, main memory 11-1 and main memory 32-1 are in the same physical memory space 301 (global physical memory). Further, in this example, processor 11 and co-processor 32 use the same virtual address space and the same virtual memory format (thus, translation tables employed by processors 11 and 32 to translate a virtual address to a physical address have the same translation entries). Further, since processor 11 and co-processor 32 use the same virtual address space, they are said to execute in the same virtual process space. As discussed further herein, in certain embodiments, a cache coherence protocol is implemented across the busses in order to allow the processors 11 and 32 to get the latest value of the memory wherever it currently exists. Thus, cache coherency 38 is maintained between the heterogeneous processors 11 and 32 in this exemplary embodiment. As one example, a global physical memory address format, such as global physical memory address format 14 discussed above with FIG. 1, may be utilized by host processor 11 and co-processor 32.

In certain embodiments, a software executable file (e.g., an a.out file or a.exe file, etc.), such as executable 35 shown in FIG. 3, may include (e.g., in its header) an identification 35-1 of one of the pre-defined instruction sets 36-1-36-N with which co-processor 32 is to be configured for use in processing a portion of the executable's instruction stream, such as instructions 35-2 show in FIG. 3. In this exemplary embodiment, such executable program 35 may be stored to persistent data storage 34, and upon being initiated, executable 35 may be loaded into main memory 11-1 of host processor 11, as shown in FIG. 3. Upon such initiation of executable 35, the system's OS 37 may determine whether co-processor 32 possesses the instruction set identified for the executable 35. In this example, executable 35 includes information 35-1 that identifies "Instruction Set Image 2" (labeled 36-2 in FIG. 3) as being the appropriate instruction set to be loaded on co-processor 32. If OS 37 determines that co-processor 32 does not possess the identified instruction set (i.e., Instruction Set Image 2 36-2 in this example), OS 37 causes co-processor 32 to be reconfigured to possess such identified instruction set. Thus, as illustrated in FIG. 3, OS 37 causes Instruction Set Image 2 36-2 to be loaded onto reconfigurable logic 32-4, thereby re-configuring co-processor 32 to have the corresponding instruction set defined by Instruction Set Image 2 36-2.

Then, a portion of the instructions of executable 35 may be off-loaded (dispatched) from host processor II for processing by co-processor 32 according to the co-processor's instruction set (i.e., as defined by Instruction Set Image 2 36-2 in this example), while a portion of the executable's instructions may be processed by host processor 11. For instance, instructions 35-2 that are included in the instruction stream of executable 35 are off-loaded to main memory 32-1 in the example of FIG. 3, in order to be processed by co-processor 32, while other instructions in the executable's instruction stream are processed by host processor 11. Accordingly, in certain embodiments, a single executable 35 (e.g., a single a.out or a.exe file) may have instructions that are processed by different, heterogeneous processors that possess different instruction sets, Thus, in certain embodiments, instructions for both the host processor 11 and the heterogeneous co-processor 32 may be intermingled within the instruction stream of executable 35. Further, host processor 11 and heterogeneous co-processor 32 may be concurrently processing different instructions from the instruction stream of executable 35.

In view of the above, certain embodiments of the present invention enable reconfigurable computing via selective use of multiple, fixed instruction sets. For instance, a plurality of different, fixed instruction sets are predefined by instruction set images 36-1, 36-2, . . . , 36-N in the example of FIG. 3 (stored on persistent storage 34), and any of such fixed instruction sets may be dynamically loaded onto co-processor 32 for use by such co-processor 32 in processing instructions of a given executable. Thus, co-processor 32 is dynamically reconfigurable with any of the instruction set images 36-1-36-N, wherein the corresponding configuration gives the co-processor 32 a particular personality by defining a fixed set of instructions that the co-processor 32 understands how to executes While certain examples provided herein describe determining (e.g., from identifying information 35-1) an instruction set image to load to the co-processor 32 and loading such instruction set to the co-processor 32 at the beginning of the program (e.g., when it is being initiated), in certain embodiments, such determining and loading may be performed additionally or alternatively at other points during execution of the executable file. In certain embodiments, the determining and loading steps are performed during a "dispatch" operation for dispatching instructions to be processed by the co-processor. Exemplary dispatch techniques that may be employed in accordance with embodiments of the present invention are described further herein. Further, while executable 35 is described as including identifying information 35-1 that identifies instruction set image 2, in certain embodiments the executable file 35 may actually include identifying information for multiple instruction set images therein that are used by the program. For instance, a first instruction set image may be identified by executable 35 to be loaded onto co-processor 32 for processing a first set of instructions of the executable that are dispatched to the co-processor 32 and a second instruction set image may later be identified by executable 35 to be loaded onto co-processor 32 for processing a second set of instructions of the executable that are dispatched to the co-processor 32. Again, in certain embodiments, the instruction set image to be loaded onto the co-processor for a given group of instructions to be dispatched to the co-processor may be determined during the dispatch operation and loaded to the co-processor 32 (if the co-processor is determined to not already possess such instruction set image). In certain embodiments, such as discussed in greater detail below, a user command block (UCB) is utilized for dispatching co-processor 32, wherein during a dispatch operation a "Dispatch Configuration Signature" for the group of instructions being dispatched to the co-processor 32 may be evaluated to determine whether it matches the instruction set image presently loaded onto the co-processor's dynamically reconfigurable logic (e.g., FPGA) 32-4, wherein if it does not match then the instruction set image identified by the Dispatch Configuration Signature is loaded to the co-processor's dynamically reconfigurable logic 32-4.

According to certain embodiments of the present invention, a plurality of instruction sets that the co-processor 32 may be configured to possess are pre-defined, such as instruction set images 36-1, 36-2, . . . , 36-N in the example of FIG. 3. It should be recognized that according to certain embodiments of the present invention, rather than requiring an instruction set that is tailored specifically for a given executable to be developed for configuring co-processor 32, certain classes or types of instruction sets may be pre-defined, wherein various different executables may utilize the same one of the pre-defined instruction sets. For instance, the inventors of the present invention have recognized that certain classes of instruction sets are commonly needed by executables, and by pre-defining an instruction set for each of those recognized classes, a large majority of types of applications can be supported without requiring individual, application-specific instruction sets to be created.

As an example, in one implementation three (3) mutually-exclusive instruction sets may be pre-defined. As an illustrative example, a first pre-defined instruction set might be a vector instruction set designed particularly for processing 64-bit floating point operations as are commonly encountered in computer-aided simulations, a second pre-defined instruction set might be designed particularly for processing 32-bit floating point operations as are commonly encountered in signal and image processing applications, and a third pre-defined instruction set might be designed particularly for processing cryptography-related operations.

For instance, instruction set 36-1 may be a vector instruction set that is designed for supporting instructions that are commonly encountered in computer-aided simulations, such as simulations that are commonly used for automobile design, crash worthiness analysis, drug design, fluid flow analysis, etc. The predominant data type for these types of operations is 64-bit floating point.

Instruction set 36-2 may be an instruction set designed for signal and image processing. Typical applications that employ these types of operations include seismic processing, hdtv simulation and design, etc. Typically, algorithms like FFT and convolution are executed. The predominant data type for these types of operations is 32-bit floating point.

Instruction set 36-N may be an instruction set designed for performing cryptography operations, which typically involves operations for manipulating bit and byte strings.

While three illustrative pre-defined instruction sets are described above, it should be recognized that embodiments of the present invention are not limited to the exemplary instruction sets mentioned above. Rather, any number of instruction sets of any type may be pre-defined in a similar manner and may be employed on a given system in addition to or instead of one or more of the above-mentioned pre-defined instruction sets.

Further, in generating an executable, a compiler may generate some instructions within the executable's instruction stream that are intended for processing by a co-processor having a different instruction set than that of the host processor. According to one embodiment, a user (e.g., programmer) may designate (e.g., in the source code being compiled or through interaction with an interface of the compiler) which instruction set to use for various instructions to be included in the executable. For instance, a user may designate to the compiler which of the plurality of pre-defined instruction sets 36-1-36-N to be loaded onto co-processor 32 for processing a portion of the executable's instructions In return, the compiler may include information, such as information 35-1, within the resulting executable that identifies the selected instruction set (e.g., instruction set image 2 36-2 in the example of FIG. 3). Further, in certain embodiments, a user may designate which instructions of the executable are to be processed by the host processor's instruction set (e.g., x86) and which instructions of the executable are to be processed by the co-processor's heterogeneous instruction set. This may be implemented via a compiler switch, for example.

According to another embodiment, the compiler may analyze the source code and determine the appropriate one of the plurality of pre-defined instruction sets to utilize for portions of the executable's instruction stream. That is, the compiler may analyze the source code that it is compiling and determine, based for example on the types of operations being encountered in the source code, the appropriate one of the plurality of pre-defined instruction sets 36-1-36-N to be identified in the executable for loading onto the co-processor 32 for processing some portion of the executable's instructions.

Further, according to certain embodiments of the present invention, cache coherency 38 is maintained between host processor 11 and the dynamically reconfigurable co-processor 32. That is, cache coherency 38 is maintained between the heterogeneous processors 11 and 32. As mentioned above, in this exemplary embodiment main memories 11-1 and 32-1 are in the same physical address space 301, and thus the heterogeneous processors 11 and 32 are accessing the same physical memory space 301 of multiprocessor system 30. Further, in this example, processor 11 and co-processor 32 use the same virtual address space and the same virtual memory format. A cache coherence protocol is implemented across the busses, such as bus 11-4 and 32-7, in order to allow the processors 11 and 32 to get the latest value of the memory wherever it currently exists. As one example, a global physical memory address format, such as global physical memory address format 14 discussed above with FIG. 1, may be utilized by host processor 11 and co-processor 32 for accessing main memories 11-1 and 32-1. Additionally, in this exemplary embodiment, the translation tables of TLBs 11-3 and 32-3 have the same translation entries for each of host processor 11 and co-processor 32.

Figure 1:
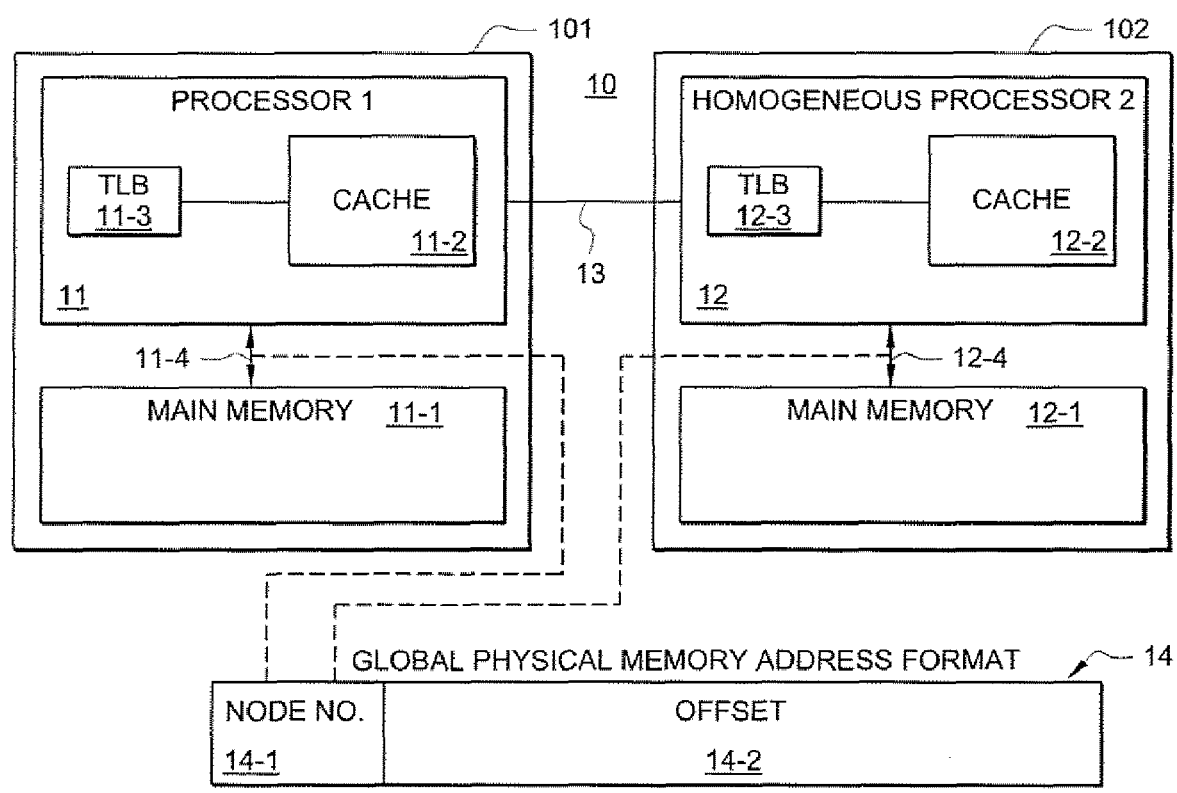
FIG. 1 shows an exemplary prior art multi-processor system employing a plurality of homogeneous processors.

As an example, suppose executable 35's instruction stream being executed by host processor 11 includes an instruction to load data from an address "Foo" into a first general-purpose register, GPR1. Such instruction may appear similar to "LD <Foo>, GRP1". Foo, in this example, is a virtual address that processor 11 translates to a physical address, such as address "123456". Thus, the actual physical address, which may be formatted according to the global physical memory address format 14 of FIG. 1 is placed on bus 11-4 for accessing main memory 11-1, for example. Cache coherency is maintained in that if co-processor 32 is also executing instructions that are attempting to access "Foo" (the physical address 123456) at the same time that processor 11 is accessing it, then the cache coherency scheme resolves this to allow the microprocessors to get the latest value of Foo.

Figure 4:
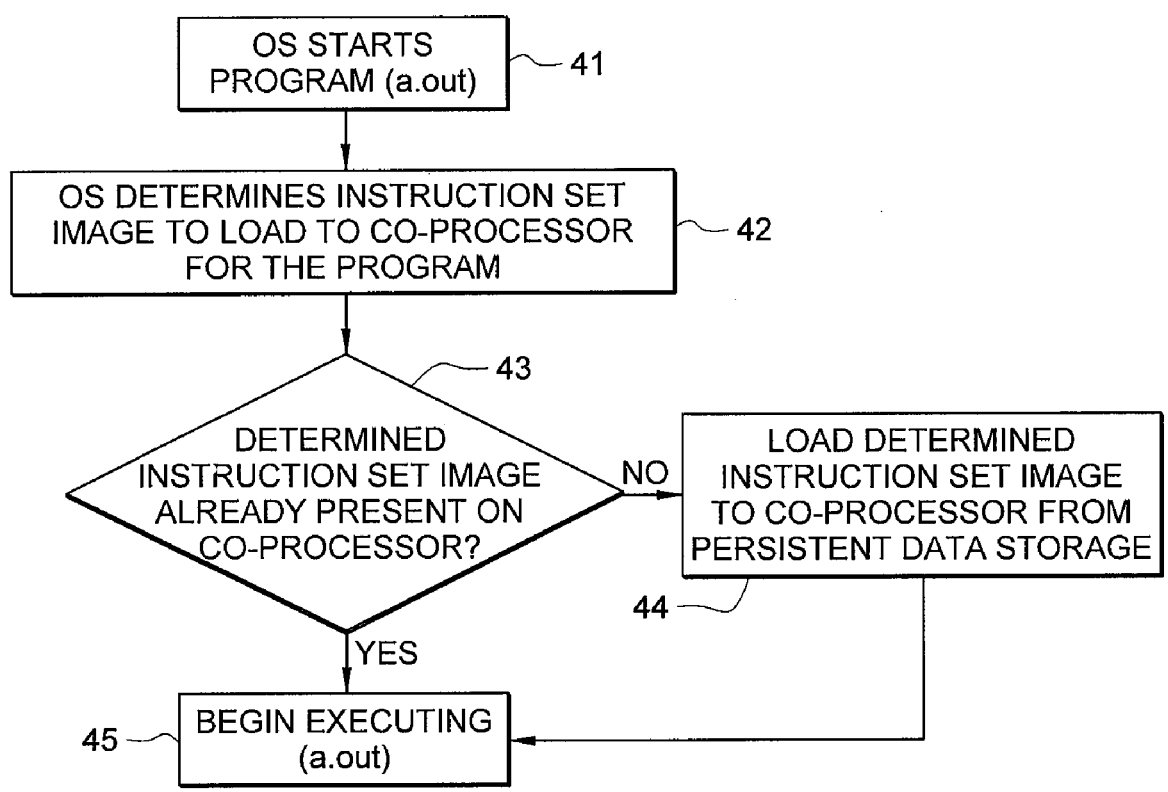
FIG. 4 shows an exemplary operational flow diagram of one embodiment of the present invention.

An exemplary operational flow diagram for one embodiment is shown in FIG. 4. In operational block 41, the system's OS 37 starts a program, such as executable 35 of FIG. 3. In operational block 42, the OS 37 determines an instruction set image, such as one of the pre-defined instruction set images 36-1-36-N, to load to a dynamically reconfigurable co-processor 32. As discussed further herein, in certain embodiments, such determination of an instruction set image may be made from identifying information included in the executable file, such as information 35-1 included in executable 35. Further, such determination of the instruction set image may be made at a point during the executable's execution in addition to or other than at the executable's initiation (beginning). In certain embodiments, the determination of the instruction set in block 42 is performed during a "dispatch" operation for dispatching instructions to be processed by the co-processor. In certain embodiments, such as discussed in greater detail below, a user command block (UCB) is utilized for dispatching co-processor 32, wherein during a dispatch operation a "Dispatch Configuration Signature" for the group of instructions being dispatched to the co-processor 32 may be evaluated to determine the instruction set image to load to the co-processor for the group of instructions being dispatched.

In operational block 43, OS 37 determines whether the determined instructions set image is present on co-processor 32. Again, such determining operation may be performed during a "dispatch" operation for dispatching instructions to be processed by the co-processor. In certain embodiments, such as discussed in greater detail below, a user command block (UCB) is utilized for dispatching co-processor 32, wherein during a dispatch operation a "Dispatch Configuration Signature" for the group of instructions being dispatched to the co-processor 32 may be evaluated to determine whether it matches the instruction set image presently loaded onto the co-processor's dynamically reconfigurable logic (e.g., FPGA) 32-4.

If the desired instruction set image is already present on co-processor 32, then operation may advance to block 45 whereat the multi-processor system begins executing instructions in the executable's instruction stream. If determined in block 43 that the desired instruction set image is not present on co-processor 32, the operation advances to block 44 where the determined instruction set image is loaded to co-processor 32. For instance, in the example illustrated in FIG. 3, the instruction set image 2 36-2 that is identified by information 35-1 included in executable 35 is loaded to reconfigurable logic 32-4 of co-processor 32 for use in processing a portion of the instructions of the executable 35 that are off-loaded (dispatched) to the co-processor 32. Once the co-processor is re-configured with the instruction set image in block 44, operation advances to block 45 whereat the multi-processor system begins executing the dispatched instructions in the executable's instruction stream.

Figure 5:
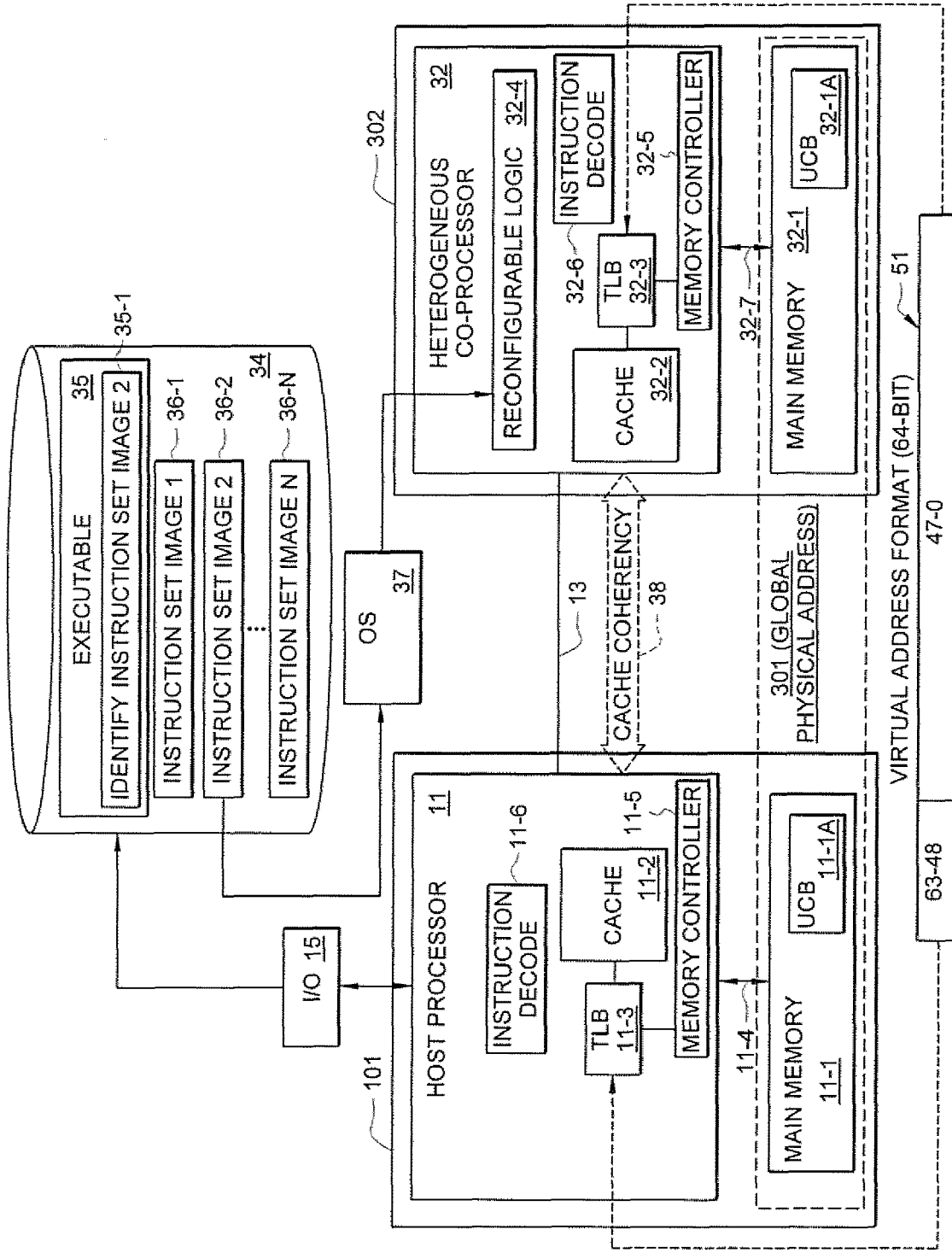
FIG. 5 shows another exemplary multi-processor system according to an embodiment of the present invention.

FIG. 5 shows, in further detail, an exemplary multi-processor system according to an embodiment of the present invention. As with the example of FIG. 3, this exemplary embodiment again includes host processor 11 having main memory 11-1, cache 11-2, and TLB 11-3 The exemplary multi-processor system again includes dynamically reconfigurable co-processor 32 having main memory 32-1, cache 32-2, TLB 32-3, and reconfigurable logic 32-4. As with the example of FIG. 3, main memories 11-1 and 32-1 are part of a common physical memory address space 301, and thus as mentioned above with the example of FIG. 3, processors 11 and 32 share the same physical memory address space 301, as well as the same virtual memory address space 51 in this example. Processors 11 and 32 are communicatively interconnected via bus 13, and, as discussed above with FIG. 3, cache coherency 38 is maintained between the heterogeneous processors 11 and 32. OS 37 is again included, as well as persistent data storage (e.g., disk) 34 to which an executable 35 and various predefined instruction set images 36-1-36-N are stored. It should be understood that while executable 35 and instruction set images 36-1-36-N are show for ease of illustration as being stored to the same persistent data storage 34, in practice they may be stored to different persistent data storage devices (which may even be different forms or types of persistent data storage, such as FLASH memory, etc.). As shown, data storage 34 may be accessible by host processor 11 via I/O 15.

As further shown in this example, host processor 11 includes instruction decode logic 11-6, and co-processor 32 includes instruction decode logic 32-6. When executable 35 is first started, it resides in persistent data storage (e.g., on disk) 34. OS 37 brings the executable 35 into the host processor's main memory 11-1. From that point, host processor 11 will start executing instructions out of the executable's instruction stream that are in main memory 11-1, and host processor 11 uses instruction decode logic 11-6 to decode those instruction stings that it is processing. Once host processor 11 starts (or "dispatches") co-processor 32 for this executable 35, some of the executable's instructions are brought from main memory 11-1 into cache 32-2 of co-processor 32. In general, OS 37 places the co-processor's instructions in main memory 32-1, which is global physical memory in this example, and the instructions may then be read by co-processor 32 into cache 32-2. Instruction decode logic 32-6 decodes those instructions for processing by co-processor 32 (according to its instruction set image loaded into reconfigurable logic 32-4). At that point in time, both host processor 11 and co-processor 32 are accessing instructions from the single executable 35 (e.g., a.out or a.exe file) loaded into main memory 11-1. Thus, at that point the heterogeneous processors 11 and 32 are executing instructions from the same executable 35. It should be noted that both instruction sets can concurrently execute. That is, host processor 11 and co-processor 32 may concurrently process their respective portions of the instructions of the executable 35.

According to certain embodiments of the present invention, a technique is employed to effectively trick the host processor's instruction set (e.g., the x86 instruction set) to support off-loading to the co-processor 32 an executable's instructions that may not be natively supported by the host processor's instruction set. According to one embodiment, this is accomplished by causing the host processor 11 to store the executable's instructions that are to be off-loaded to the co-processor 32 (e.g., instructions 35-2 of the example of FIG. 3) to a pre-designated portion of memory, which may be referred to herein as a user command block (UCB), such as UCB 11-1A of main memory 11-1 or UCB 32-1A of main memory 32-1. The co-processor 32 monitors the UCB 11-1A to detect when instructions have been stored thereto, and upon detection of instructions in the UCB 11-1A, the co-processor processes those instructions with the instruction set with which reconfigurable logic 32-4 has been configured.

The above-mentioned cache coherency between the host processor 11 and the co-processor 32 enables the host processor 11 and co-processor 32 to use the UCB 11-1A in this manner. In this example, the TLB 32-3 or 11-3 accepts as its input a virtual address 51 (e.g., a 64-bit virtual address in one embodiment). The format of the virtual address is identical for processors 11 and 32. The output of the TLB is a global physical address, such as global physical address 14 of FIG. 1. The memory controller 11-5 or 32-5 of the respective processor whose TLB outputs the global physical address examines the global physical address. If the node number (14-1 of FIG. 1) indicates that the node is local, the offset bits (14-2 of FIG. 1) are used to read from the local main memory. For instance, if TLB 11-3 of host processor 11 receives a virtual address 51 and outputs a determined global physical address, the memory controller 11-5 determines whether the node identified by the global physical address is node 101, and if node 101 is identified, then the offset bits (14-2 of FIG. 1) of the global physical address are used to read from the local main memory 11-1 of node 101. If the node number of the global physical address indicates an external node, such as node 302, then the offset bits of the global physical address are transferred to the external node 302 via bus 13, whereat memory controller 32-5 analyzes such global physical address, and the offset bits of the received global physical address are then used to access node 302's main memory 32-1 according to the offset bits.

In this manner, when generating a given executable, a compiler can include in the executable 35 instructions that may not be supported by the host processor's instruction set but which are instead intended for processing under a different instruction set (where the co-processor is dynamically configured to execute this different instruction set). The compiler can also include in the executable's instruction stream an instruction to cause the host processor 11 to load certain instructions of the executable 35 (such as those instructions 35-2 of FIG. 3 that are intended for processing by the co-processor's instruction set) to the UCB 11-1A. Such a loading operation is supported by the host processor's native instruction set, although processing of those instructions that it loads to the UCB 11-1A may not be supported by the host processor's native instruction set.

Figure 6A:
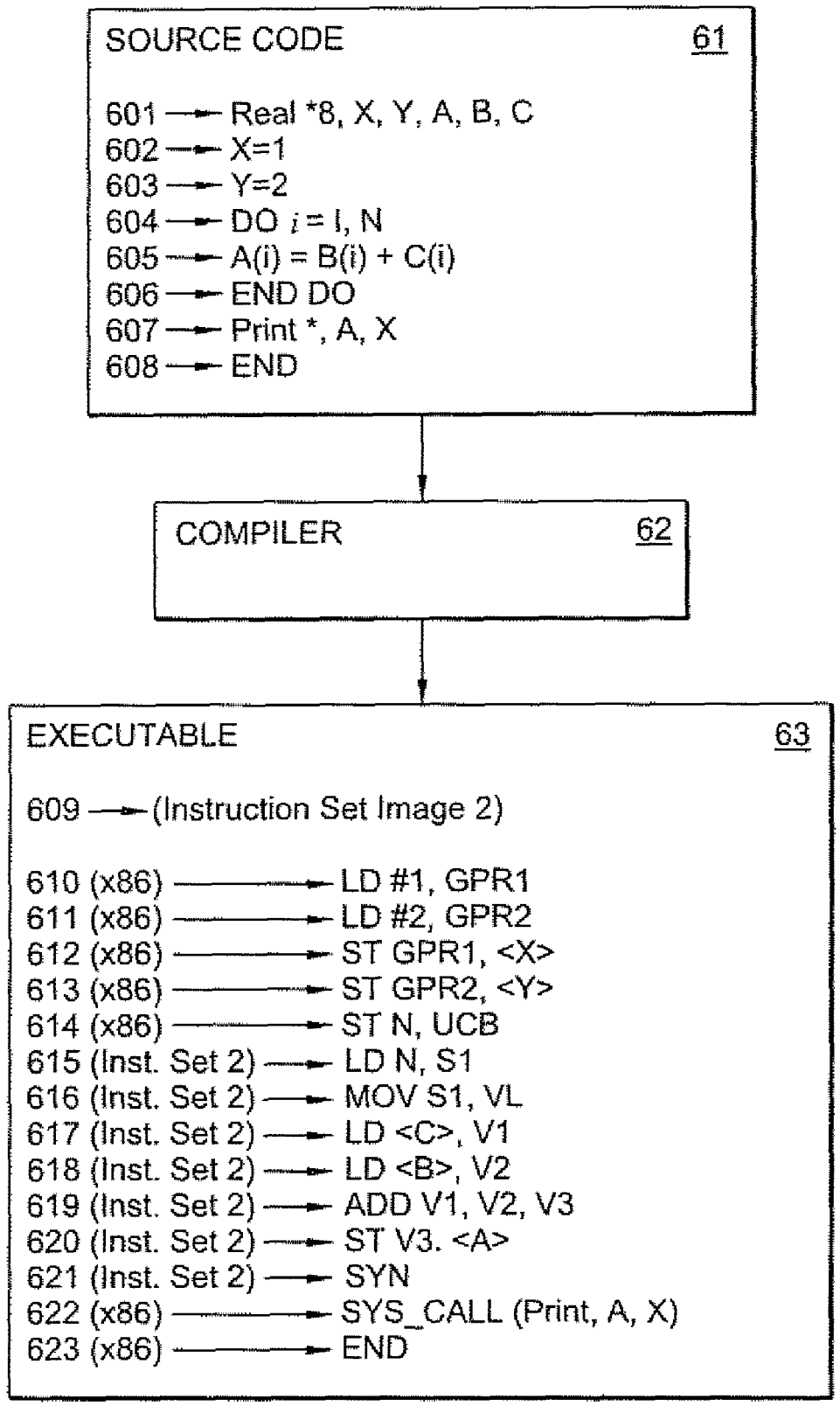
FIG. 6A shows an exemplary block diagram for a compiler generating an executable that comprises instructions that are executed by heterogeneous processors according to an embodiment of the present invention.
Figure 6B:
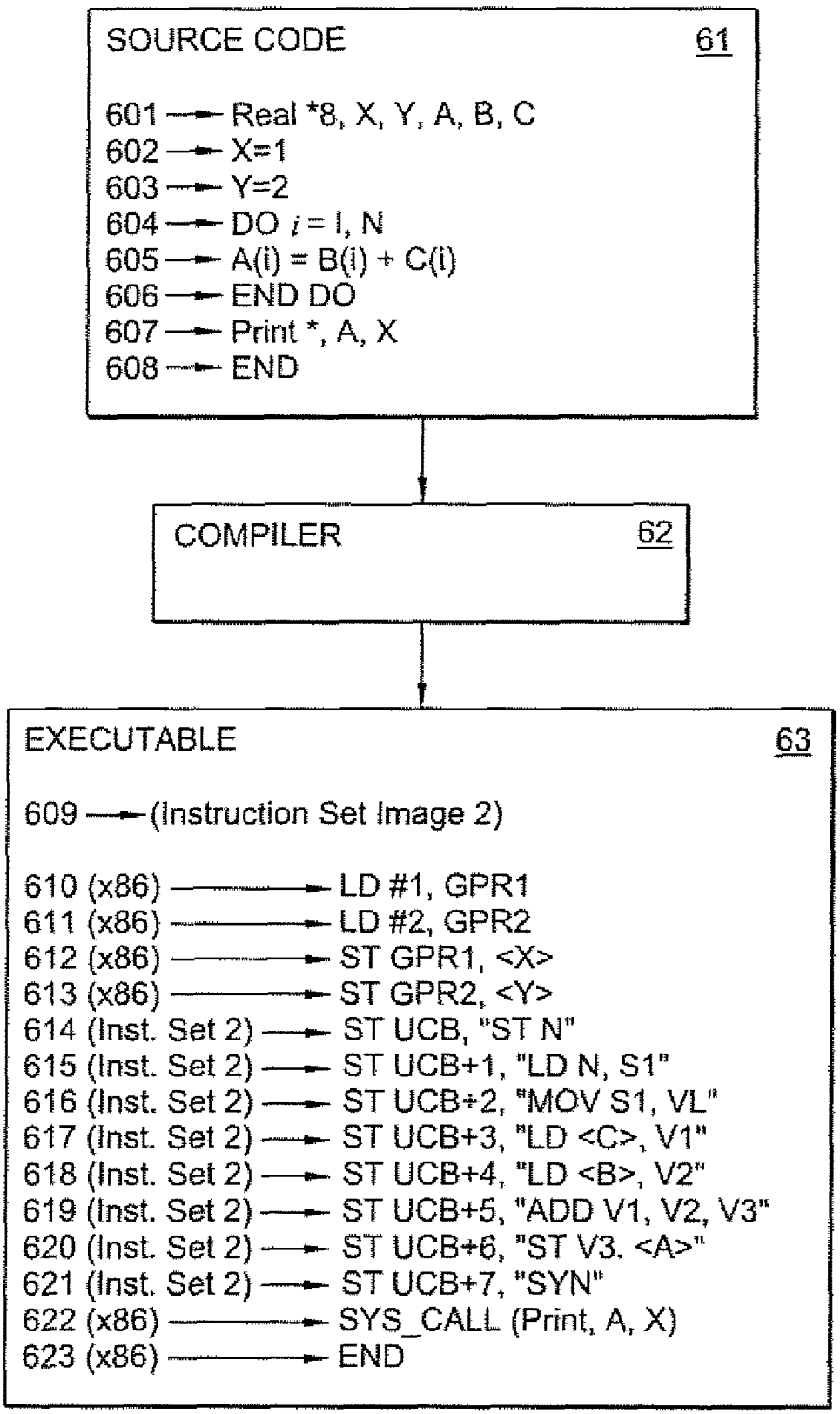
FIG. 6B shows another exemplary block diagram for a compiler generating an executable that comprises instructions that are executed by heterogeneous processors according to an embodiment of the present invention.

FIGS. 6A-6B show examples of a compiler 62 generating an executable 63 according to embodiments of the present invention. Turning first to FIG. 6A, an exemplary executable that may be generated in accordance with embodiments of the present invention is shown. FIG. 6A shows source code 61, which may be coded in a high-level programming language such as FORTRAN, C, C++, VISUAL C, BASIC, or VISUAL BASIC, as examples. The exemplary source code 61 provides a simple, descriptive example in which variables X, Y. A, B, and C are defined (in line 601 of the code). Then, a value of 1 is loaded into X (in line 602 of the code), and a value of 2 is loaded into Y (in line 603 of the code). A DO LOOP is initiated (in line 604 of the code) during which the Vectors B and C are added with the result placed in vector A (in line 605 of the code). The DO LOOP operation is closed in line 606 of the code, and line 607 of the code causes the values of A and X to be printed. The program ends in line 608 of the code.

Compiler 62 processes this source code to produce an executable 63, such as executable 35 of FIGS. 3 and 5 discussed above. The source code 61 is thus processed by compiler 62 to produce executable program 63 having instructions 610-623. Additionally, the executable 63 may comprise an identification of an instruction set image to load on to co-processor 32 for processing instructions of the executable. For instance, such identification of instruction set image 2 36-2 is included in line 609 of executable 63. As mentioned above, the compiler 62 may determine such an instruction set to be identified in any of a number of ways, including through user (e.g., programmer) designation thereof and/or through the compiler's analysis of the source code's operations to determine an appropriate one of a plurality of pre-defined instruction sets to employ on co-processor 32.

Executable program 63 may be stored to persistent data storage 34 of a multi-processor system, as discussed above with executable 35. Further, when started by host processor 11, executable 63 is loaded into main memory 11-1. As discussed above, OS 37 identifies (e.g., from line 609, which may be included in the header information of executable 63) the instruction set image (e.g., instruction set image 2 in this example) to be loaded onto co-processor 32, and if such instruction set image is not already present on the co-processor 32, it is loaded onto the co-processor's reconfigurable logic 324.

As discussed below, executable 63 contains instructions to be processed by the host processor 11 (with the host processor's fixed instruction set, which is x86 in this example), and executable also contains instructions to be processed by the heterogeneous co-processor 32 (with the instruction set 2 36-2 that is to be loaded onto the co-processor in this example). Each instruction shown in exemplary executable 63 that is to be processed by the host processor's x86 instruction set is shown with a prefix of x86 in this example, whereas each instruction that is to be processed by the co-processor's instruction set (i.e., instruction set 2 in this example) is shown with a prefix of "Inst. Set 2" in this example. Such prefixes are shown for illustrative purposes only to aid in understanding this example, and the prefixes are preferably not actually included in the resulting executable 63. It should be noted that all memory addresses are virtual 51 for all instructions in executable 63 in this example. It should also be noted that traditional accelerators, such as GPU 16-1 of FIG. 2 discussed above, do not use virtual addresses to reference their local memory.

The first instruction (at line 610 of the executable 63) is to load value 1 into a first general-purpose register, GPR1. In this example, this is an instruction that is to be performed by the host processor 11. That is, this is an instruction to be processed by the host processor's fixed instruction set, which in this example is x86, and is thus shown with a prefix of x86 for illustrative purposes. The next instruction (at line 611 of the executable) is to load value 2 into a second general-purpose register, GPR2. As with the first instruction, this is an instruction that is to be performed by the host processor 11, and is thus shown with a prefix of x86 for illustrative purposes. The next instructions (at lines 612-613 of the executable) set variable <X> to the value of GPR1 variable <Y> to the value of GPR2. Again, these are instructions to be performed by the host processor 11, and are thus show with a prefix of x86 for illustrative purposes. The x86 hardware, as designed and manufactured, directly executes instructions 610-614 in this example.

Next, a dispatch command (at line 614 of the executable 63) to initiate co-processor 32 is performed. In this exemplary embodiment, a designated memory area, referred to herein as a user command block (UCB), is used for initiating co-processor 32. In FIG. 5, an exemplary UCB 11-1A is illustrated in main memory 11-1. Alternatively, a UCB 32-1A may be included in main memory 32-1 and utilized in a manner as that described hereafter with reference to UCB 11-1A. According to this exemplary embodiment, co-processor 32 monitors the UCB 11-1A for a command to be placed in it (via the cache coherency protocol), and once a command is detected in the UCB 11-1A, the co-processor retrieves that command and begins processing it according to its configured instruction set.

That is, co-processor 32 is monitoring bus 13 to detect whether a command is placed in UCB 11-1A. Thus, in this example, the instruction at line 614 of the executable 63 causes host processor 11 to store N to the UCB 11-1A. According to one embodiment, co-processor instructions are stored one at a time into the UCB 11-1A. That is, as each instruction that is to be offloaded to co-processor 32 is encountered, compiler 62 may include in the instruction stream an instruction that causes the host processor 11 to store such instruction to UCB 11-1A. These instructions conform to the instruction set that is to be decoded by instruction decode 32-6. According to another embodiment, an entire block of instructions may be stored into the UCB 11-1A. In this latter embodiment, one host processor instruction (e.g., an x86 instruction) is included to initiate one cache coherency protocol transaction, which causes the co-processor 32 to begin fetching (loading) the co-processor instructions that were placed into UCB 11-1A. These co-processor instructions are not executed on host processor 11.

With respect to host processor 11, the co-processor instructions look like a store of a literal (a constant) to main memory. The literal is the binary representation of the co-processor instruction(s). This literal can be pre-compiled in one big unit or individually stored in the UCB. Since the UCB is cache coherent, this effectively tricks the host processor 11's instruction set to support the off-loading of certain instructions included in the single executable's instruction stream to the co-processor 32.

In the illustrated example of FIG. 6A, instructions 615-621 are off-loaded, via being stored to UCB 11-1A, to co-processor 32. In the illustrated example, these instructions 615-621 may comprise 64-bit floating point vector operations as are commonly encountered in computer-aided simulations. Thus, a pre-defined instruction set (e.g., instruction set image 2 in this example) that is appropriate for efficiently processing these types of operations may be loaded onto co-processor 32's reconfigurable logic 32-4. The variables C and B exist in the same virtual address space as variables X and Y. Since the virtual address spaces are identical and the contents of the translation tables are identical, a global physical address space is directly generated.

In this exemplary embodiment, the SYN instruction at line 621 in this example is used to indicate that the co-processor 32 has completed all its computation and control is returned to the host processor 11. In line 622, the host processor 11 performs a SYS_CALL operation to print (display) the values stored to A and X. The executable ends in a normal fashion with instruction 623.

The memory coherency 38 of the multiprocessor system enables the above-described type of dispatch technique to be employed. That is, by maintaining cache coherency, the host processor can write instructions to UCB 11-1A that are to be processed by co-processor 32, and co-processor 32 can read those instructions for processing Further, such cache coherency enables the co-processor to perform operations and store values to virtual addresses that are accessible by the host processor, and vice-versa. For instance, in the example of FIG. 6A, co-processor 32 computes value Vs and stores it to virtual address "A" (in lines 619 and 620), and host processor 11 can likewise read virtual address "A" for printing (displaying) the value V3 stored thereto in line 622. Thus, maintaining cache coherency and a common virtual address space enables efficient operation between the host processor 11 and the co-processor 32 in processing the instructions 610-623 of the executable 63.

Turning now to FIG. 6B, another exemplary executable 63 that may be generated in accordance with an embodiment of the present invention is shown. FIG. 6B again shows source code 61 and compiler 62, as in FIG. 6A above. The source code 61 is processed by compiler 62 to produce executable program 63 having instructions 610-623. Additionally, the executable 63 may comprise an identification of an instruction set image to load on to co-processor 32 for processing instructions of the executable. For instance, such identification of instruction set image 2 36-2 is included in line 609 of executable 63. As mentioned above, the compiler 62 may determine such an instruction set to be identified in any of a number of ways, including through user (e.g., programmer) designation thereof and/or through the compiler's analysis of the source code's operations to determine an appropriate one of a plurality of pre-defined instruction sets to employ on co-processor 32.

Executable program 63 may be stored to persistent data storage 34 of a multi-processor system, as discussed above with executable 35. Further, when started by host processor 11, executable 63 is loaded into main memory 11-1. As discussed above, OS 37 identifies (e.g., from line 609, which may be included in the header information of executable 63) the instruction set image (e.g., instruction set image 2 in this example) to be loaded onto co-processor 32, and if such instruction set image is not already present on the co-processor 32, it is loaded onto the co-processor's reconfigurable logic 32-4.

Instructions 610-613 and 622-623 of executable 63 of FIG. 6B are the same as discussed above with FIG. 6A. However, instructions 614-621 provide an alternative exemplary implementation. In this example, all of the instruction set 2 instructions are executed in the host processor 11 via a store literal (constant) instruction. This effectively tricks the host processor's instruction set into storing to the UCB the instructions that are to be processed by co-processor 32. For example, instruction 614 causes the host processor 11 to store to the UCB the instruction "ST N". The stores performed in instructions 614-621 in this example are to successive locations in the UCB region of main memory, as illustrated by UCB, UCB+1, ..., UCB+7. Since the UCB is cache coherent, any change in the contents of a UCB can be detected by the co-processor 32's decode logic 32-6. The literal's (or co-processor instruction encodings) stored to the UCB have no meaning on the host processor's instruction set (e.g., x86) but have meaning on the co-processor 32 that is configured with instruction set 2. Thus, this provides an alternative exemplary technique that may be employed according to embodiments of the present invention for dispatching instructions for processing by co-processor 32.

According to certain embodiments of the present invention, a plurality of instruction sets that co-processor 32 may be configured to possess are pre-defined, such as instruction set images 36-1-36-N. The plurality of instruction sets may be stored to a persistent data storage 34 (e.g., to disk) of the multi-processor system, such that a given executable may identify any of the plurality of pre-defined instruction sets to be loaded onto the co-processor 32 for use by the co-processor in processing a portion of the given executable's instruction stream.

Further, in certain embodiments, a compiler, such as compiler 62 of FIG. 6A, determines (e.g., from user designation and/or through analysis of the source code being compiled) the appropriate one of the plurality of pre-defined instruction sets to identify for the executable, and the compiler selects the instructions in the executable's instruction stream that are to be off-loaded to the co-processor for processing according to the selected instruction set.

In the above exemplary implementations discussed with FIGS. 6A-6B, two alternative dispatch mechanisms that may be employed by embodiments of the present invention are described. The dispatch mechanisms effectively "trick" the host processor's instruction set into dispatching instructions to be processed by the co-processor 32. A first dispatch mechanism that may be employed is to have the co-processor instruction image already placed in a memory area. This memory area contains the coprocessor instructions that are to be executed when the co-processor 32 is initiated.

In a conventional processor, the PC (program counter) is loaded with the address of this memory area, a branch is taken and the instructions are executed. Certain embodiments of the present invention employ a dispatch mechanism to get the co-processor to do the same thing. One way this is done, such as in the example of FIG. 6A discussed above, is via the owner field of user mode issue memory structure. In this first exemplary dispatch mechanism, the co-processor 32 is always referencing the owner field (a location in shared virtual address space). When the owner field is "0", the co-processor 32 knows that there is nothing to execute. In essence, this is the co-processor's idle mode. Thus, the co-processor is executing a "spin wait" operation (a well-known operation in the art), wherein the co-processor is spinning on the location waiting for a particular value (i.e., other than 0). Suppose then the host processor 11 (which may have an x86 or other fixed instruction set) decides that it wants to initiate a co-processor operation. The various command structures are setup (or have already been setup by the compiler). Most of this can be statically configured. Then, the host processor 11 writes a "1" into the owner field. Since physical memos is cache coherent, even if the owner field is stored in the host processor cache (which it generally would be), the new value of the owner field is obtained when the co-processor references the same physical memory location (via a translated virtual address). The co-processor thus sees a "1" and now starts fetching co-processor instructions from the UCB. The wait is over and now there is work to be done by the co-processor.

According to one exemplar implementation, the Issue memory structure is used to indicate whether the host processor 11 or co-processor 32 owns the Command and Status memory structures. Table 1 below shows an exemplary format of the Issue memory structure. The IssueBase physical address is equivalent to addresses UserBase+0×000 or User-Base+0×400.

TABLE 1

| | Bits: | | |
|---|---|---|---|
| | 63    16 | 15    0 | |
| IssueBase + 0x00 | Rsvd | Owner | |
| IssueBase + 0x08 | Rsvd | | |
| . | | | |
| . | | | |
| . | | | |
| IssueBase + 0x40 | | | |

In this example, the Owner field of the Issue memory structure indicates the current owner of the command and status memory structures. When the Owner field has the value zeros the command set is not active and the host processor 11 can read status of the previous dispatched command, or write the command memory structures to setup a new command. When the Owner field has the value one, the command set is owned by the coprocessor 32 and the current command is being performed. Modification of the command memory structures when the Owner field is a one may cause the previously dispatched routine to give unexpected results.

Further, in this exemplary implementation, a single user mode command is defined. The command is Routine Dispatch. The format of the command memory structure is shown below in Table 2. The CmdBase physical address is equivalent to addresses UserBase+0x100 or UserBase+0x 500.

TABLE 2

| | Bits: | | | | |
|---|---|---|---|---|---|
| | 63    48 | 47    32 | 31    16 | 15    0 | |
| CmdBase + 0x00 | | Dispatch Sequence Number | | | |
| CmdBase + 0x08 | | Dispatch Instruction Pointer | | | |
| CmdBase + 0x10 | | Dispatch Configuration Signature | | | |
| CmdBase + 0x18 | $S_{RtnCnt}$ | $S_{RtnBase}$ | $S_{CallCnt}$ | $A_{CallCnt}$ | |
| CmdBase + 0x20 | | 28 Quad Words Available for Software Use (these words are pre-loaded into co-processor registers $A_8$ to $A_{8+ACallCnt-1}$ and $S_1$ to $S_{1+CallCnt-1}$) | | | |
| CmdBase + 0x100 | | | | | |

In this exemplary implementation, the user mode command structure has the following defined fields (shown in Table 3):

TABLE 3

| Field Name | Description |
|---|---|
| Dispatch Sequence Number | Value passed to co-processor and then returned in status memory structure. Used by host processor to determine when routine has completed. The value is not used by the co-processor. |
| Dispatch Instruction Pointer | Virtual address of first instruction of co-processor routine. |
| Dispatch Configuration Signature | Signature of required application engine configuration. This signature is checked prior to beginning the dispatched co-processor routine to ensure that the appropriate application engine configuration is loaded. The operating system is interrupted if the loaded application engine configuration signature does not match the Dispatch Configuration Signature field. |
| $A_{DispCnt}$ | Number of parameters to be preloaded into A-registers prior to beginning the coprocessor routine. Parameters are copied into A-registers started with register $A_8$. |
| $S_{DispCnt}$ | Number of parameters to be preloaded into S-registers prior to beginning the co-processor routine. Parameters are copied into S-registers started with register $S_1$. |

TABLE 3-continued

| Field Name | Description |
|---|---|
| $S_{RtnBase}$ | First S-register to be copied into status memory structure when co-processor executes the return complete instruction. |
| $S_{RtnCnt}$ | Number of S-registers to be copied into status memory structure when co-processor executes the return complete instruction. |
| Quad Word Parameters | Parameters preloaded into A and S registers prior to beginning compressor routine. Note that A register parameters reside in lower order addresses followed by S-register parameters. |

According to embodiments of the present invention, the co-processor may be dispatched via any of various different dispatch techniques. One exemplary dispatch technique writes an instruction to the UCB. Another exemplary dispatch technique writes a block of instructions to the UCB. The exemplary approach described above with reference to Table 3 writes the address of a block of instructions into the UCB. The UCB field name for the address is "Dispatch Instruction Pointer".

The status memory structure is used in this exemplary implementation to determine when the co-processor has finished executing a routine and to obtain any returned values. An exemplary format of the Status Memory Structure is shown in Table 4 below. The StatusBase physical address is equivalent to addresses UserBase+0x300 or UserBase+0x 700.

TABLE 4

| | Bits: | |
|---|---|---|
| | 63    0 | |
| StatusBase + 0x00 | Dispatch Sequence Number | |
| StatusBase + 0x08 | Dispatch Instruction Pointer | |
| StatusBase + 0x10 | Six Quad Words Available for Software Use (these six words are obtained from co-processor registers $S_{SRtnBase}$ to $S_{SRtnBase+SRtnCnt-1}$) | |
| StatusBase + 0x40 | | |

The exemplary user mode status memory structure of this exemplary implementation contains the following defined fields (of Table 5):

TABLE 5

| Field Name | Description |
|---|---|
| Dispatch Sequence Number | Value passed to co-processor at time of dispatch and then returned in status memory structure. Used to determine when routine has completed. |

TABLE 5-continued

| Field Name | Description |
|---|---|
| Dispatch Instruction Pointer | Virtual address of first instruction of completed co-processor routine. This field is provided for debug visibility only. |
| Quad Word Parameters | Parameters returned from completed co-processor routine. The specific S-register values copied to the Status Memory Structure are determined by the $S_{RmBase}$ and $S_{RmCnt}$ fields of the Command memory structure. |

In this exemplary implementation, two command sets are used for dispatching co-processor routines. Alternating between the two command sets results in higher application performance by reducing co-processor idle time. One command set can be being setup for the next command while the other set is being used by the co-processor. Note that using a single command set to dispatch the co-processor routines will function properly, albeit somewhat slower.

The steps for issuing a user command (e.g., instructions of an executable) to the co-processor according to this exemplary implementation comprise:
 1. Select the command set (0 or 1) to be used to issue the command. A host processor variable that is incremented once per issued command can be used to select which command set is to be used. If the variable is even then use set #0, otherwise use set #1.
 2. Read the value of the Issue memory structure Owner field. Loop until the Owner field is zero.
 3. Setup the new command by writing to the fields of the selected set's Command memory structure. The fields can be written in any order and any operand width. Note that the variable used in step #1 can be written to the Dispatch Sequence Number field to provide a dispatch unique identifier.
 4. Issue the new command by writing a one to the Owner field of the Issue memory structure.

Once the coprocessor has been issued a command, the resulting status can be obtained with the following steps:
 1. Read the value of the Dispatch Sequence Number field from the Status memory structure. Loop until the obtained value equals the value specified in the Command memory structure.
 2. Access the returned parameters from the Status memory structure.

Note that the transition from one to zero of the Owner field indicates that the coprocessor can accept another user command (however, the current command may not have finished). The completion of a command is determined by monitoring the Command Sequence Number field in the status memory structure. The above-described sequence uses cache coherency mechanisms and will function correctly in the presence of speculative memory accesses. Additionally, the mechanism will operate correctly for a system implemented with the current FSB (Front Side Bus) technology or the forthcoming CSI (Common System Interconnect) technology, as examples.

Implementing the dispatch mechanism according to this first exemplary dispatch mechanism has several advantages, including the following:
 there are no hardware-based interrupts. Thus, there is no extra hardware required.
 the speed of the dispatch is optimal. Microprocessor designs optimize the logic for cache coherency in that the minimal time for coherency transactions is a high level design objective.
 the dispatch mechanism is totally in the user space. No OS calls are required. This reduces the time to dispatch to a minimum.
 since the dispatch mechanism is under software control, enhancement and/or modifications are straightforward.
 multiple forms of dispatch can be defined.

Alternatively, a second exemplary dispatch mechanism, such as the exemplary dispatch mechanism discussed above with FIG. 6B, may be employed. In this exemplary technique, instructions may be individually dispatched one instruction at a time to the co-processor. In one exemplary implementation, the UCB area that is to have instructions is cleared to all 0's. The co-processor 32 performs a spin wait on UCB location 0. If that location contains value "0", then the co-processor 32 continues to spin waiting. If "not 0", then the co-processor 32 decodes and executes the instruction contained in the UCB location 0. It should be noted that the instruction is a literal value (a bit string) with respect to the host processor 11. A co-processor encoding has no meaning to the host processor 11 in this example. For instance, in this example, a co-processor instruction encoding of "0" means no co-processor instruction. The UCB address is then incremented by 1, and the co-processor decodes that next UCB location. If such UCB location 1 contains value "0", then that UCB location does not have a co-processor instruction. If such UCB location 1 contains a value "not 0", then the co-processor 32 decodes and executes the instruction contained in the UCB location 1. The co-processor 32 continues fetching UCB locations until the SYN co-processor instruction is decoded. This is the last instruction of any co-processor instruction group in this example.

In certain embodiments, the co-processor 32 may know (e.g., via a status field) which form of dispatch to utilize (e.g., which of the two exemplary dispatch mechanisms mentioned above to utilize).

The above-described exemplary dispatch mechanisms effectively "trick" the host processor to dispatch co-processor instructions to the co-processor 32. Both of these exemplary dispatch mechanisms employ a combination of using hardware-based cache coherency along with such techniques as: spin wait synchronization, specific instruction encodings (e.g., SYN), software to emulate what is normally a hardware-based dispatch mechanism, and hardware-based (e.g., via FPGA) decoding of co-processor instructions.

In view of the above according to certain embodiments, a novel dispatch mechanism is provided for a multi-processor system, wherein the dispatch mechanism may comprise one or more of the following features:
 1. Activity of a cache line is monitored to determine that a dispatch command is ready. As discussed above, the sequence of events for dispatching a co-processor in certain embodiments are.
   a) using a field (e.g., the owner field) within the Issue data structure to indicate ownership of a user command block,
   b) watching for cache line activity of the Issue data structure by monitoring cache coherency requests that are sent from the host processor to the co-processor,
   c) checking the value of the owner field when the co-processor determines that cache line activity is occurring with the Issue data structure, and
   d) if the owner field is the value "1," then reading the Command data structure (table 2) to dispatch the co-processor.
 2. A mechanism is provided for initializing selected co-processor registers as part of the dispatch mechanism. That is, selected registers of the co-processor can be initialized as part of dispatching instructions to be processed by the co-processor For instance, as discussed above in certain embodiments, the Command data structure uses the Acallcnt and Scallcnt fields to specify how many registers are to be initialized as part of the dispatch. The values used to initialize the registers are obtained from the Command data structure (CmdBase+ 0x20).

3. A Status data structure is provided that is monitored by the host processor to indicate status of a co-processor command. For instance, in certain embodiments, the host processor monitors the Dispatch Sequence Number field to determine that a specific dispatch has completed. The Dispatch sequence number is passed in as a field of the Command data structure and written to the Status data structure by the co-processor as the last step of executing a co-processor routine.

4. Results are passed back from the co-processor to the host processor using the Status data structure. The Command data structure Srtnbase and Srtncnt are used to indicate which co-processor registers are to be copied to the Status data structure upon co-processor routine completion.

5. A field in the Command data structure is used to specify the required reconfigurable instruction set that is needed for the dispatched co-processor routine (i.e., the dispatched instructions of an executable that are to be processed by the co-processor). In the above example, the field is named Dispatch Configuration Signature.

Figure 7A:
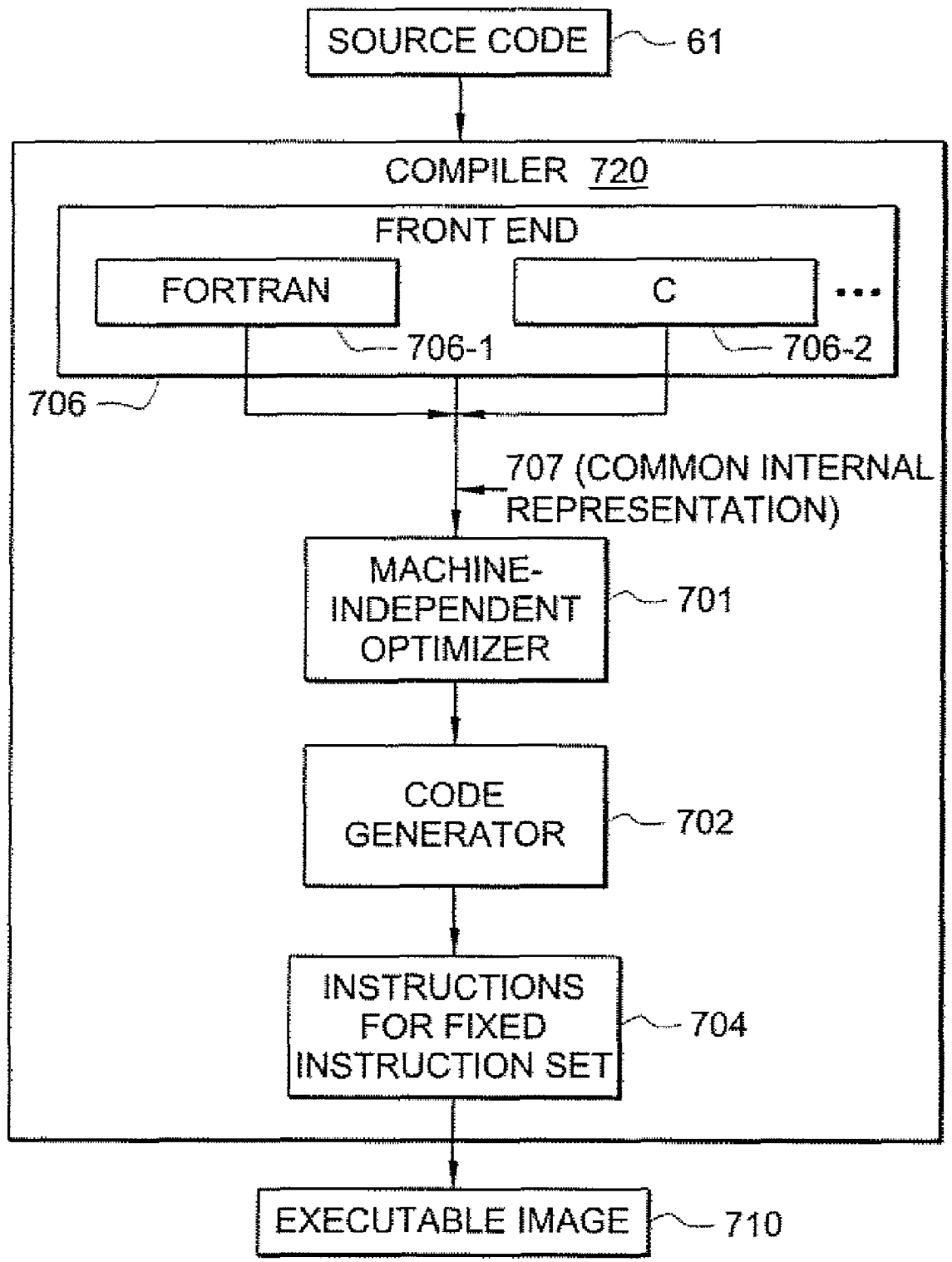
FIG. 7A shows an exemplary block diagram of a traditional compiler of the prior art.
Figure 7B:
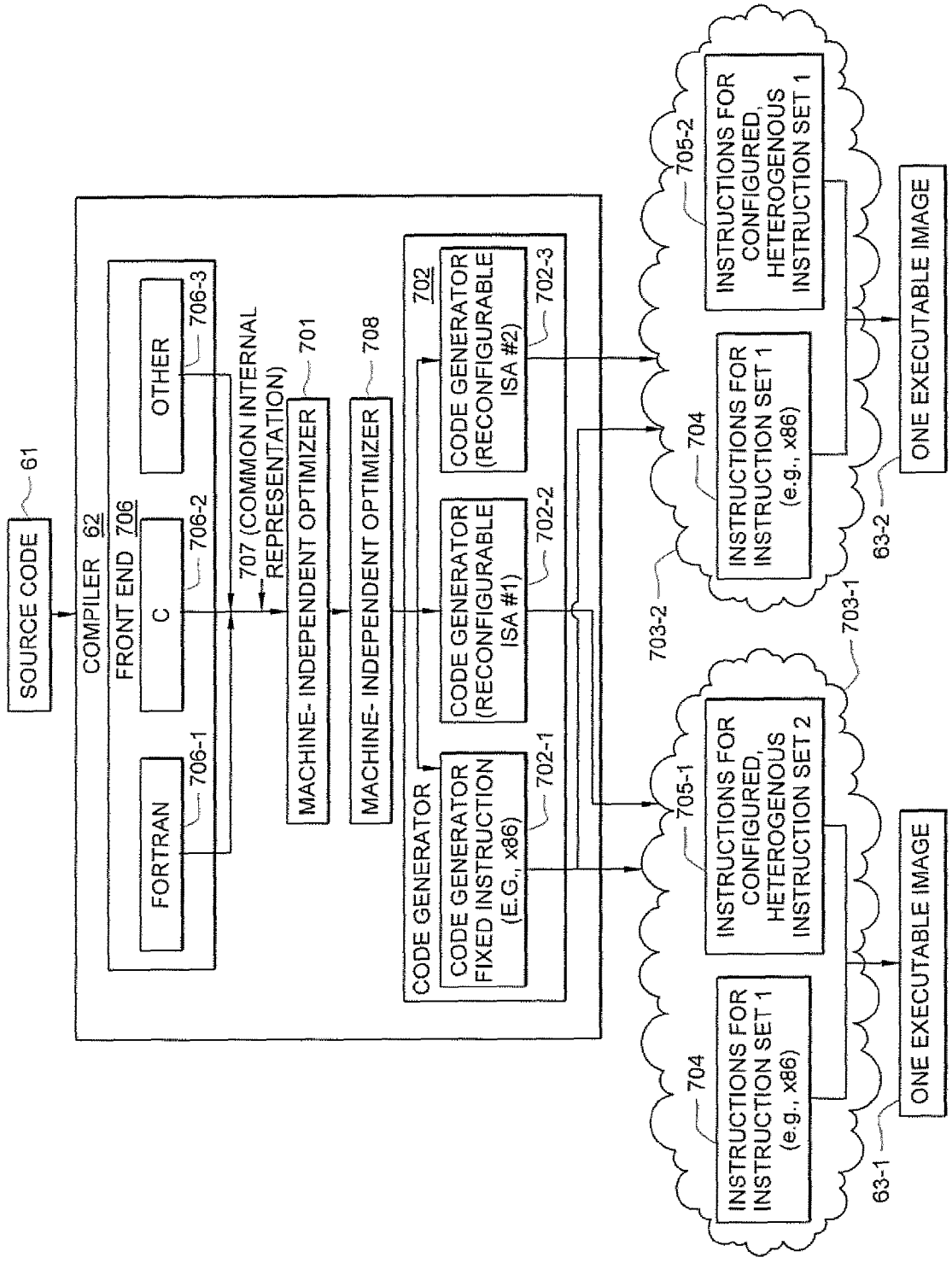
FIG. 7B shows another exemplary block diagram of a compiler according to certain embodiments of the present invention, wherein such compiler generates an executable that comprises instructions that are executed by heterogeneous processors.

Turning to FIGS. 7A-7B, an exemplary novel compiler that may be employed according to certain embodiments of the present invention is discussed. FIG. 7A shows an exemplary traditional compiler 720 of the prior art. In FIG. 7A, an example is shown in which compiler 720 processes source code 61 (e.g., FORTRAN, C, etc.) to generate executable instructions 704 within an executable image 710. Compiler 720 may comprise a language front-end processor 706, a machine-independent optimizer 701, and a code generator 702. Multiple language front ends (e.g., Fortran 706-1, C 706-2, etc.) generate a common intermediate internal representation 707, The machine-independent optimizer 701 performs optimizations (e.g., strength reduction, common subexpression elimination, etc) that enhance the performance of the executable image 710. The code generator 702 takes the output of the machine-independent optimizer 701 and generates instructions 704 for a fixed instruction set of a microprocessor, such as for a micro-processor having an x86 or other fixed instruction set. The generated instructions 704 included in an executable image 710 that can be executed by a micro-processor (or multiple homogeneous processors, such as those of FIG. 1) having the fixed instruction set (e.g., x86).

Turning to FIG. 7B, an exemplary compiler that may be employed according to certain embodiments of the present invention is shown. In FIG. 7B, an example is shown in which compiler 62 processes source code 61 (e.g., FORTRAN, C, etc.) to generate executable instructions 703-1 and/or 703-2. Compiler 62 may comprise a language front-end processor 706, a machine-independent optimizer 701, a machine-dependent optimizer 708, and a code generator 702, as examples. Multiple language front ends (e.g. Fortran 706-1, C 706-2, etc.) generate a common intermediate internal representation 707. The machine-independent optimizer 701 performs optimizations (e.g., strength reduction, common subexpression elimination, etc) that enhance the performance of the executable image. The code generator 702 takes the output of the machine-dependent optimizer 708 and generates instructions for a micro-processor. In this exemplary embodiment, there are multiple code generators (e.g., 702-1 for the x86, 702-2, for reconfigurable instruction set 1, 702-3 for reconfigurable instruction set #2, etc). The output of the machine-independent optimizer 701 is provided to the input of machine-dependent optimizer 708. The machine-dependent optimizer 708 determines which reconfigurable instruction set that is to be used. If reconfigurable instruction set 11 is chosen, then code generators 702-1 and 702-2 are invoked. If reconfigurable instruction set #2 is chosen, then code generators 702-1 and 702-3 are invoked. In all cases, code generator 702-1, the instruction set of the host processor, is chosen in this example.

The generated executable instructions 703-1 comprise instructions for a plurality of different, heterogeneous instruction sets, such as instructions 704 for a first instruction set (e.g., x86), which may be an instruction set employed by a host processor 11, and instructions 705-1 for a second instruction set, which may be an instruction set that is dynamically loaded onto co-processor 32. Similarly, the generated executed instructions 703-2 comprise instructions for a plurality of different, heterogeneous instruction sets, which in this example again include instructions 704 for a first instruction set (e.g., x86), which may be an instruction set employed by a host processor 11, and instructions 705-2 for a heterogeneous instruction set (instruction set 1 in this example), which may be an instruction set that is dynamically loaded onto co-processor 32. As a consequence of the ability for the co-processor 32 to support mutually exclusive instruction sets, compiler 62 may comprise a plurality of code generators 702 that are each operable to generate code for the different pre-defined instruction sets 36-1-36-N that may be loaded onto the co-processor 32.

As shown, compiler 62 generates, for each of the executable instructions 703-1 and 703-2, a single executable file (e.g., a single a.out, a.exe, etc.), show as executable files 63-1 and 63-2, respectively. Executable file 63-1 comprises the instructions 704 and 705-1 for heterogeneous instruction sets, while executable file 63-2 comprises the instructions 704 and 705-2 for heterogeneous instruction sets (i.e., the instruction sets 704 and 705-1 are different). As such, instructions for a plurality of heterogeneous instruction sets may be intermingled within a single executable 63-1 or 63-2, and the heterogeneous instructions may be processed by heterogeneous processors 11 and 32 in the manner described above.

While an exemplary compiler 62 that may be employed by certain embodiments of the present invention is described above with FIG. 7B, it should be recognized that the other concepts presented herein are not limited to the exemplary compiler 62. For instance, the various aspects of the exemplary multi-processor system having heterogeneous host processor and co-processor described further herein are not limited by the compiler that is employed for generating an executable. Rather, any compiler that is now known or later developed for generating a single executable that comprises instructions to be processed by the heterogeneous host processor and co-processor may be employed.

Figure 8:
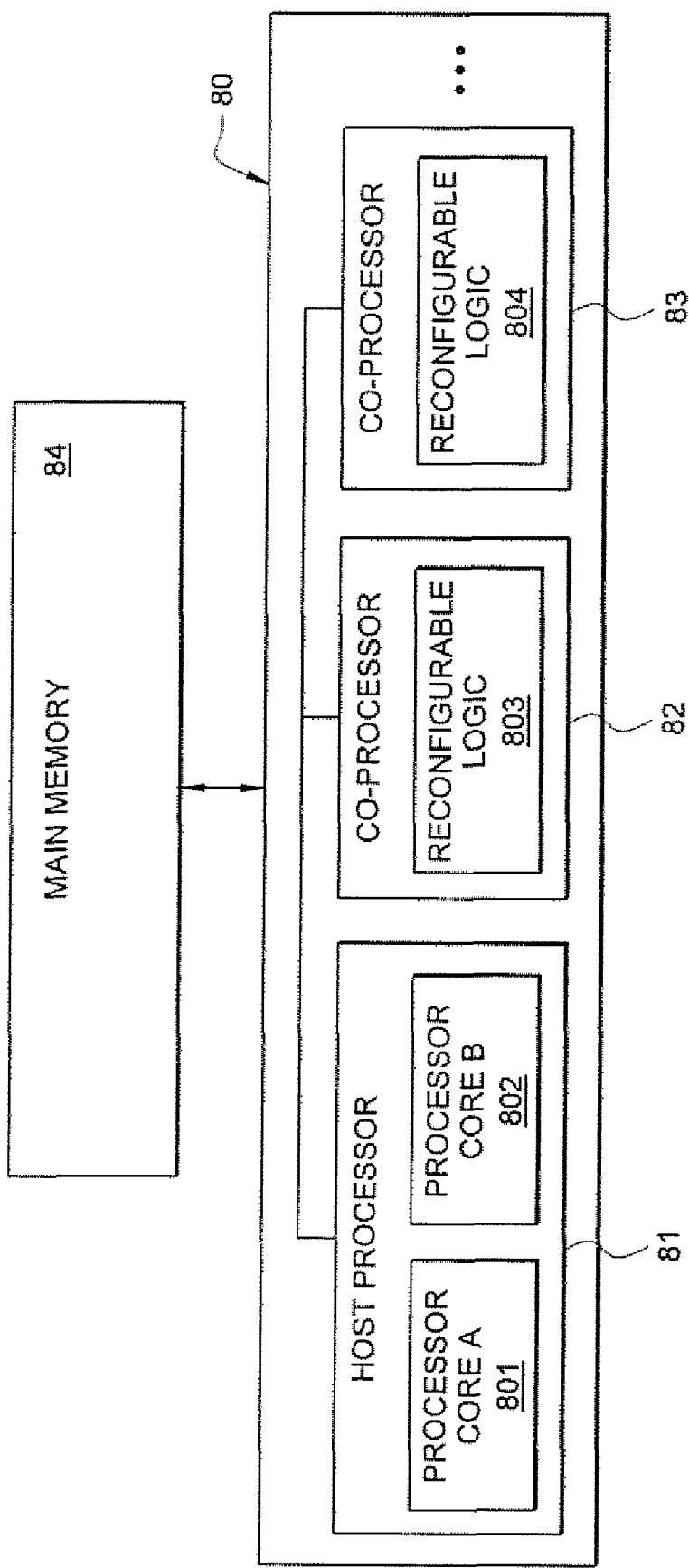
FIG. 8 shows an exemplary multi-processor architecture in which at least one host processor and at least one dynamically reconfigurable co-processor are implemented on a common integrated circuit.

It should be recognized that embodiments of the present invention may be adapted to any appropriate scale or granularity within a given system. For instance, a host processor 11 and co-processor 32 may be implemented as separate processors (e.g., which may be implemented on separate integrated circuits). In other architectures, such host processor 11 and co-processor 32 may be implemented within a single integrated circuit (i.e., the same physical die). Further, while a single host processor 11 and co-processor 32 are shown in the above examples for ease of illustration and discussion, it should be appreciated that a plurality of processors may be so employed. For instance, host processor 11 may include a plurality of homogeneous processors (or processor cores), such as the exemplary homogeneous processors 11 and 12 described above with FIG. 1. Further, a plurality of heterogeneous co-processors 32 may be implemented in a given system, each of which may be dynamically reconfigurable to possess any of a plurality of different instruction sets (wherein the different co-processors may be configured with the same or with different instruction sets). One exemplary system architecture is shown in block diagram form in FIG. 8 for illustrative purposes. As shown, an integrated circuit 80 may include a host processor 81, which comprises cores 801 and 802. Integrated circuit 80 further includes co-processors 82 and 83, which comprise reconfigurable logic 803 and 804, respectively.

Further, it should be recognized that while a single heterogeneous co-processor 32 is described for each of discussion in the above examples, any number of such heterogeneous co-processors may be likewise employed. Additionally, two or more heterogeneous co-processors 32 may be configured with different instruction sets and may each be used for processing instructions from a common executable. For example, an executable may designate a first instruction set to be configured onto a first of the heterogeneous co-processors and a second instruction set to be configured onto a second of the heterogeneous co-processors, wherein a portion of the executable's instruction stream may be processed by the host processor 11 while other portions of the executable's instruction stream may be processed by the first and second heterogeneous co-processors.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a manufactured processor element having a fixed instruction set that defines instructions that the processor element can execute and that is not modifiable by a consumer, and a reconfigurable co-processor, wherein said processor element is not designed to natively offload to said reconfigurable co-processor instructions of an executable file that is running on the processor element;
said reconfigurable co-processor comprising reconfigurable logic that is reconfigurable to have an entirety of any one of a plurality of predefined extended instruction sets for extending the fixed instruction set of the processor element for processing instructions of an executable file, each of said plurality of predefined extended instruction sets defining a plurality of instructions that the reconfigurable co-processor can execute, wherein said plurality of instructions comprise extended instructions that are not natively defined by the fixed instruction set of the processor element, and wherein the extended instruction sets are not embedded within said executable file;
said processor element comprises a first instruction decode logic that is operable to decode instructions of the executable file that are defined by the processor element's fixed instruction set for execution by the processor element; and wherein the reconfigurable co-processor comprises a second instruction decode logic that is operable to decode instructions of the executable file that are defined by the extended instruction set that the reconfigurable co-processor is configured to have for execution by the reconfigurable co-processor;
said reconfigurable co-processor sharing a common virtual and physical address space with said processor element; and
a global shared, cache coherent physical address space, whereby the processor element comprises a physical memory and a cache, and whereby the co-processor comprises a physical memory and a cache, and wherein data contained in the processor element's cache and the co-processor's cache are maintained in a cache coherent state.

2. The system of claim 1 wherein said cache coherency is maintained via hardware.

3. The system of claim 1 wherein said fixed instruction set of said processor element is an x86 instruction set.

4. The system of claim 1 further comprising:
persistent data storage for storing said plurality of predefined extended instruction sets, each said predefined extended instruction set optimized for processing a corresponding class of operations.

5. The system of claim 4 further comprising:
means for selecting which of said stored extended instruction sets is to be used by said co-processor as its instruction set.

6. The system of claim 5 wherein said selecting means is enabled by said executable file executing on said system, wherein said co-processor processes a portion of an instruction stream of said executable file using the selected extended instruction set.

7. The system of claim 6 wherein the extended instruction set selected for use by said co-processor as its instruction set is not included in said executable file.

8. The system of claim 1 wherein said co-processor's instruction set is changeable in accordance with said executable file currently being run on said system, said executable file running partially on said processor element and partially on said co-processor.

9. The system of claim 8 wherein said instruction set of said co-processor is changeable within said co-processor dependent upon an identity of at least one of said plurality of predefined extended instruction sets by said currently running executable file.

10. The system of claim 8 wherein a portion of said executable file executes on said processor element concurrent with a portion of said executable file executing on said co-processor.

11. The system of claim 1 further comprising:
said first processor element and said co-processor using a common virtual memory format.

12. The system of claim 11 further comprising:
said processor element comprising a first translation table for translating virtual addresses to physical addresses;

said co-processor comprising a second translation table for translating virtual addresses to physical addresses; and wherein said first translation table and said second translation table have common translation entries.

13. The system of claim 1 further comprising:

said processor element's physical memory comprising a first main memory;

said co-processor's physical memory comprising a second main memory; and wherein said first main memory and said second main memory are in a common global physical memory space.

14. The system of claim 13 further comprising:

a designated portion of at least one of said first main memory and said second main memory to which the processor element stores instructions of the executable file for processing by said co-processor.

15. The system of claim 1 wherein a first portion of said executable file executes on said processor element and a second portion of said executable file executes on said co-processor.

16. The system of claim 15 wherein said first portion and said second portion of said executable file execute concurrently.

17. The system of claim 1 wherein said processor element is implemented on a first integrated circuit, and said reconfigurable co-processor is not implemented on said first integrated circuit.

18. A method comprising:

initiating an executable file for processing instructions of the executable file by a system, wherein the system comprises at least one host processor having a first instruction decode logic and an instruction set that defines instructions that the first instruction decode logic can decode for execution by the at least one host processor, and the system further comprising at least one dynamically reconfigurable co-processor having a second instruction decode logic, wherein said at least one host processor comprises a manufactured host processor having a fixed instruction set that is not modifiable by a consumer, and wherein said at least one dynamically reconfigurable co-processor is not implemented on a same integrated circuit as said manufactured host processor;

determining one of a plurality of fixed instruction set images to load to said at least one dynamically reconfigurable co-processor for processing a portion of the instructions of the executable file, wherein the determined instruction set image defines an instruction set having a plurality of instructions that the second instruction decode logic can decode for execution by the dynamically reconfigurable co-processor, and wherein said plurality of instructions of the determined instruction set image comprise extended instructions that are not natively defined by the instruction set of the at least one host processor, and wherein the determined instruction set image is not embedded within the executable file;

when determined that the determined instruction set image is not present on the dynamically reconfigurable co-processor, loading the determined instruction set image in its entirety from persistent storage to the dynamically reconfigurable co-processor; and processing, by the system, the instructions of the executable file, wherein a first portion of the instructions of the executable file that are defined by the instruction set of the at least one host processor is decoded by the first instruction decode logic and processed by the at least one host processor and a second portion of the instructions of the executable file comprising one or more of said extended instructions defined by the determined instruction set image is decoded by the second instruction decode logic and processed by the at least one dynamically reconfigurable co-processor, wherein said processing of said second portion of the instructions by the at least one dynamically reconfigurable co-processor does not require determining on an instruction-by-instruction basis whether the dynamically reconfigurable co-processor is configured with an instruction set that defines said instructions of said second portion, and wherein said at least one host processor is not designed to natively offload said second portion of instructions in said executable file executing on said at least one host processor to said at least one dynamically reconfigurable co-processor for processing.

19. The method of claim 18 further comprising:

determining whether the dynamically reconfigurable co-processor is configured to possess said determined instruction set image.

20. The method of claim 18 wherein determining the instruction set image to load to said at least one dynamically reconfigurable co-processor comprises:

determining the instruction set image from information included in the executable file.

21. The method of claim 20 wherein the information included in the executable file identifies one of the plurality of fixed instruction set images.

22. The method of claim 21 wherein each of said plurality of fixed instruction set images is optimized for processing a corresponding class of operations.

23. The method of claim 22 wherein said plurality of fixed instruction set images comprise at least one of the following:

a vector instruction set designed for efficiently processing 64-bit floating point operations;

a vector instruction set designed for efficiently processing 32-bit floating point operations;

an instruction set designed for efficiently processing cryptography-related operations;

an instruction set designed for efficiently performing operations for manipulating bit or byte strings;

an instruction set designed for efficiently performing computer-aided simulation operations; and an instruction set designed for efficiently performing image processing operations.

24. The method of claim 18 wherein said instruction set of the at least one host processor is an x86 instruction set.

25. The method of claim 18 further comprising:

maintaining cache coherency between said at least one host processor and said at least one dynamically reconfigurable co-processor.

26. The method of claim 18 wherein said loading comprises:

loading the determined instruction set image to the co-processor before beginning execution of any of said instructions of the executable file by said at least one host processor and said at least one dynamically reconfigurable co-processor.

* * * * *

UNITED STATES PATENT AND TRADEMARK OFFICE
CERTIFICATE OF CORRECTION

| | |
|---|---|
| PATENT NO. | : 8,156,307 B2 |
| APPLICATION NO. | : 11/841406 |
| DATED | : April 10, 2012 |
| INVENTOR(S) | : Steven Wallach et al. |

It is certified that error appears in the above-identified patent and that said Letters Patent is hereby corrected as shown below:

In the Claims:

Column 29, Claim 18, Line 41, delete the portion of text reading "haying a fixed" and replace with --having a fixed--.

Signed and Sealed this
Fifth Day of June, 2012

David J. Kappos
*Director of the United States Patent and Trademark Office*